US012200623B2

(12) United States Patent
Kim et al.

(10) Patent No.: US 12,200,623 B2
(45) Date of Patent: Jan. 14, 2025

(54) ADAPTIVE CONFIGURED GRANT FOR POWER SAVING

(71) Applicant: QUALCOMM Incorporated, San Diego, CA (US)

(72) Inventors: Yuchul Kim, San Diego, CA (US); Wanshi Chen, San Diego, CA (US); Jay Kumar Sundararajan, San Diego, CA (US); Hwan Joon Kwon, San Diego, CA (US); Linhai He, San Diego, CA (US); Ravi Agarwal, San Diego, CA (US); Miguel Griot, La Jolla, CA (US); Krishna Kiran Mukkavilli, San Diego, CA (US); Yeliz Tokgoz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 479 days.

(21) Appl. No.: 17/475,172

(22) Filed: Sep. 14, 2021

(65) Prior Publication Data

US 2022/0095224 A1     Mar. 24, 2022

Related U.S. Application Data

(60) Provisional application No. 63/080,380, filed on Sep. 18, 2020.

(51) Int. Cl.
*H04W 52/02*     (2009.01)
*H04W 72/23*     (2023.01)

(52) U.S. Cl.
CPC ....... *H04W 52/0225* (2013.01); *H04W 72/23* (2023.01)

(58) Field of Classification Search
CPC ............. H04W 52/0225; H04W 72/23; H04W 72/0453; H04L 5/006; H04L 1/0009;
(Continued)

(56) References Cited

U.S. PATENT DOCUMENTS

2018/0139734 A1 *  5/2018  Babaei ................ H04W 72/23
2018/0206246 A1 *  7/2018  Zhang ................. H04L 1/1896
(Continued)

FOREIGN PATENT DOCUMENTS

WO    WO-2018130183 A1    7/2018

OTHER PUBLICATIONS

Huawei, et al., "Transmission with Configured Qrant in NR Unlicensed Band", 3GPP Draft, 3GPP TSG RAN WG1 Meeting #97, R1-1906047, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019 May 13, 2019 (May 13, 2019), XP051727504, 22 Pages (Part 2), Retrieved from the Internet: URL: http://www.3gpp.org/ftp/Meetings%5F3GPP%5FSYNC/RAN1/Docs/R1%2D1906047%2Ezip [retrieved on May 13, 2019] Chapter 1 Introduction, Chapter 2.4.2.2 gNB-Triggered Transmission with Configured Grant, Chapters 3.2 HARQ ID Determination, 3.3 HARQ Feedback Indication, 5 CG-UCI on PUSCH, 6 Transmission Adaptation.

(Continued)

*Primary Examiner* — Walli Z Butt
(74) *Attorney, Agent, or Firm* — Holland & Hart LLP

(57) ABSTRACT

Methods, systems, and devices for wireless communications are described. A user equipment (UE) may be receive a grant configuration including multiple set of parameters, and the UE may select a set of parameters from the configured grant based on a channel condition. In some examples, the UE may be configured to signal to a network (e.g., a base station) the selected set of parameters and their corresponding parameter values. For example, the UE may be configured to signal the selected set of parameters over semi-static signaling (e.g., radio resource control (RRC) messaging) or dynamic signaling (e.g., medium access control-control element (MAC-CE) messaging, uplink control information (Continued)

(UCI) messaging, or the like). By configuring the UE with multiple set of parameters, the UE may adapt to changing channel conditions, which may provide higher reliability and lower latency for wireless communications, as well as reduce power consumption for the UE.

24 Claims, 20 Drawing Sheets

(58) Field of Classification Search
CPC ..... H04L 5/0094; H04L 1/0003; Y02D 30/70; H04B 7/0695
See application file for complete search history.

(56) References Cited

U.S. PATENT DOCUMENTS

| | | | |
|---|---|---|---|
| 2019/0387418 A1 | 12/2019 | Yerramalli et al. | |
| 2020/0275413 A1* | 8/2020 | Zhang | H04W 80/02 |
| 2024/0314848 A1* | 9/2024 | Xiong | H04L 5/0094 |

OTHER PUBLICATIONS

International Search Report and Written Opinion—PCT/US2021/050553—ISA/EPO—Dec. 21, 2021 (207879WO).

* cited by examiner

ADAPTIVE CONFIGURED GRANT FOR POWER SAVING

CROSS REFERENCE

The present Application for Patent claims the benefit of U.S. Provisional Patent Application No. 63/080,380 by KIM et al., entitled "ADAPTIVE CONFIGURED GRANT FOR POWER SAVING," filed Sep. 18, 2020, assigned to the assignee hereof, and expressly incorporated by reference herein.

FIELD OF TECHNOLOGY

The following relates to wireless communications, and more specifically to an adaptive configured grant for power saving.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). These communication devices may support various extended reality (XR) applications, such as augmented reality (AR), mixed reality (MR), and virtual reality (VR). In XR applications, these communication devices may generate and send pose information and other control information to avoid visual conflicts, such as misaligning objects between real and virtual environments, and other visual conflicts. In some cases, transmission of the pose information and other control information by these communication devices may be impacted due to changes in channel conditions. It therefore may be desirable to manage downlink reception and uplink transmission related to XR applications, among other examples, for power saving.

SUMMARY

Various aspects of the present disclosure relate to configuring a communication device, such as a UE and a base station, for example, an eNodeB (eNB), a next-generation NodeB or a giga-NodeB (either of which may be referred to as a gNB) of wireless communication system to support a grant configuration (also referred to as a configured grant) including multiple set of parameters. A set of parameters may include, but is not limited to, a repetition factor value, a modulation and coding scheme (MCS) index value, a transport block size (TBS) index value, a number of layers, a number of antenna ports, a precoding matrix indicator (PMI) index value, etc. In some cases, channel conditions (e.g., a link quality) may vary and negatively impact downlink reception and uplink transmission associated with an XR application. The UE may be configured to select a set of parameters from the configured grant based on the channel condition. Thus, the UE may adapt to changing channel conditions, which may result in improved reliability for downlink reception and uplink transmission, as well as reduce power consumption for the UE. The present disclosure may, as a result, also promote high reliability and low latency XR-related operations, among other benefits.

A method of wireless communication at a UE is described. The method may include receiving a grant configuration including multiple set of parameters, each set of parameters including one or more parameters for semi-persistent uplink data, selecting a set of parameters from the multiple set of parameters based on a channel condition, and transmitting, to a base station, the semi-persistent uplink data using the selected set of parameters.

An apparatus for wireless communication is described. The apparatus may include a processor, memory coupled with the processor, and instructions stored in the memory. The instructions may be executable by the processor to cause the apparatus to receive a grant configuration including multiple set of parameters, each set of parameters including one or more parameters for semi-persistent uplink data, select a set of parameters from the multiple set of parameters based on a channel condition, and transmit, to a base station, the semi-persistent uplink data using the selected set of parameters.

Another apparatus for wireless communication is described. The apparatus may include means for receiving a grant configuration including multiple set of parameters, each set of parameters including one or more parameters for semi-persistent uplink data, selecting a set of parameters from the multiple set of parameters based on a channel condition, and transmitting, to a base station, the semi-persistent uplink data using the selected set of parameters.

A non-transitory computer-readable medium storing code for wireless communication at a UE is described. The code may include instructions executable by a processor to receive a grant configuration including multiple set of parameters, each set of parameters including one or more parameters for semi-persistent uplink data, select a set of parameters from the multiple set of parameters based on a channel condition, and transmit, to a base station, the semi-persistent uplink data using the selected set of parameters.

Some examples of the method, apparatuses, and non-transitory computer-readable medium described herein may further include operations, features, means, or instructions for transmitting an indication of the one or more parameters associated with the selected set of parameters.

In some examples of the method, apparatuses, and non-transitory computer-readable medium described herein, the indication identifies one or more parameter values of the one or more parameters associated with the selected set of parameters for the semi-persistent uplink data.

In some examples of the method, apparatuses, and non-transitory computer-readable medium described herein, the indication identifies the selected set of parameters for the semi-persistent uplink data.

In some examples of the method, apparatuses, and non-transitory computer-readable medium described herein, the one or more parameters include a repetition factor value, an MCS index value, a TBS index value, a number of layers, a number of antenna ports, a PMI index value, or a combination thereof.

In some examples of the method, apparatuses, and non-transitory computer-readable medium described herein, transmitting the indication may include operations, features, means, or instructions for transmitting the indication of the one or more parameters associated with the selected set of parameters on an uplink channel using one or more uplink resources.

In some examples of the method, apparatuses, and non-transitory computer-readable medium described herein, the uplink channel includes a physical uplink control channel (PUCCH).

In some examples of the method, apparatuses, and non-transitory computer-readable medium described herein, the one or more uplink resources include one or more preconfigured PUCCH resources associated with one or more grant resources associated with the grant.

In some examples of the method, apparatuses, and non-transitory computer-readable medium described herein, the one or more uplink resources and the one or more grant resources include a same periodicity.

In some examples of the method, apparatuses, and non-transitory computer-readable medium described herein, the one or more uplink resources and the one or more grant resources include a different periodicity.

In some examples of the method, apparatuses, and non-transitory computer-readable medium described herein, transmitting the indication may include operations, features, means, or instructions for transmitting, in a medium access control-control element (MAC-CE) message, the indication of the one or more parameters associated with the selected set of parameters via the semi-persistent uplink data, and applying the one or more parameters associated with the selected set of parameters for a subsequent semi-persistent uplink data based on transmitting, in the MAC-CE message, the indication of the one or more parameters associated with the selected set of parameters via the semi-persistent uplink data.

Some examples of the method, apparatuses, and non-transitory computer-readable medium described herein may further include operations, features, means, or instructions for multiplexing the MAC-CE message with another uplink transmission, where transmitting, in the MAC-CE message, the indication of the one or more parameters associated with the selected set of parameters via the semi-persistent uplink data may be based on multiplexing the MAC-CE message with the other uplink transmission.

In some examples of the method, apparatuses, and non-transitory computer-readable medium described herein, transmitting the indication may include operations, features, means, or instructions for transmitting, in a radio resource control (RRC) message, the indication of the one or more parameters associated with the selected set of parameters.

Some examples of the method, apparatuses, and non-transitory computer-readable medium described herein may further include operations, features, means, or instructions for transmitting, to the base station, a report identifying a channel degradation level based on the channel condition, and receiving, from the base station via a downlink channel, a message to select the set of parameters associated with the grant configuration based on the transmitted report, the set of parameters including a periodicity, one or more offsets for one or more configured grants, a repetition factor value, or a number of slots allocated in a configured grant, or any combination thereof.

In some examples of the method, apparatuses, and non-transitory computer-readable medium described herein, the message includes a MAC-CE message, an RRC message, or a downlink control information (DCI) message, or a combination thereof.

In some examples of the method, apparatuses, and non-transitory computer-readable medium described herein, the downlink channel includes a physical downlink control channel (PDCCH).

Some examples of the method, apparatuses, and non-transitory computer-readable medium described herein may further include operations, features, means, or instructions for receiving, from the base station via a downlink channel, a message including downlink parameters and uplink parameters associated with the semi-persistent uplink data for an XR application, where selecting the set of parameters associated with the grant configuration may be based on the received downlink and uplink parameters.

In some examples of the method, apparatuses, and non-transitory computer-readable medium described herein, the downlink parameters or the uplink parameters, or both, include a discontinuous reception cycle, a grant periodicity, a semi-persistent scheduling periodicity, a scheduling request periodicity, or a combination thereof.

A method of wireless communication at a base station is described. The method may include transmitting, to a UE, a grant configuration including multiple set of parameters, each set of parameters including one or more parameters for semi-persistent uplink data and receiving the semi-persistent uplink data from the UE, the semi-persistent uplink data associated with a set of parameters selected from the multiple set of parameters by the UE or the base station.

An apparatus for wireless communication is described. The apparatus may include a processor, memory coupled with the processor, and instructions stored in the memory. The instructions may be executable by the processor to cause the apparatus to transmit, to a UE, a grant configuration including multiple set of parameters, each set of parameters including one or more parameters for semi-persistent uplink data and receive the semi-persistent uplink data from the UE, the semi-persistent uplink data associated with a set of parameters selected from the multiple set of parameters by the UE or the base station.

Another apparatus for wireless communication is described. The apparatus may include means for transmitting, to a UE, a grant configuration including multiple set of parameters, each set of parameters including one or more parameters for semi-persistent uplink data and receiving the semi-persistent uplink data from the UE, the semi-persistent uplink data associated with a set of parameters selected from the multiple set of parameters by the UE or the base station.

A non-transitory computer-readable medium storing code for wireless communication at a base station is described. The code may include instructions executable by a processor to transmit, to a UE, a grant configuration including multiple set of parameters, each set of parameters including one or more parameters for semi-persistent uplink data and receive the semi-persistent uplink data from the UE, the semi-persistent uplink data associated with a set of parameters selected from the multiple set of parameters by the UE or the base station.

Some examples of the method, apparatuses, and non-transitory computer-readable medium described herein may further include operations, features, means, or instructions for receiving an indication of the one or more parameters associated with the selected set of parameters.

In some examples of the method, apparatuses, and non-transitory computer-readable medium described herein, the indication identifies one or more parameter values of the one or more parameters associated with the selected set of parameters for the semi-persistent uplink data.

In some examples of the method, apparatuses, and non-transitory computer-readable medium described herein, the indication identifies the selected set of parameters for the semi-persistent uplink data.

In some examples of the method, apparatuses, and non-transitory computer-readable medium described herein, the one or more parameters include a repetition factor value, an MCS index value, a TBS index value, a number of layers, a number of antenna ports, a PMI index value, or a combination thereof.

In some examples of the method, apparatuses, and non-transitory computer-readable medium described herein, receiving the indication may include operations, features, means, or instructions for receiving, in a MAC-CE message, the indication of the one or more parameters associated with the selected set of parameters via the semi-persistent uplink data.

In some examples of the method, apparatuses, and non-transitory computer-readable medium described herein, receiving the indication may include operations, features, means, or instructions for receiving, in an RRC message, the indication of the one or more parameters associated with the selected set of parameters.

Some examples of the method, apparatuses, and non-transitory computer-readable medium described herein may further include operations, features, means, or instructions for receiving, from the UE, a report identifying a channel degradation level based on the channel condition, and transmitting, to the UE via a downlink channel, a message to select the set of parameters associated with the grant configuration based on the transmitted report, the set of parameters including a periodicity, one or more offsets for one or more configured grants, a repetition factor value, or a number of slots allocated in a configured grant, or any combination thereof.

In some examples of the method, apparatuses, and non-transitory computer-readable medium described herein, the message includes a MAC-CE message, an RRC message, or a DCI message, or a combination thereof.

In some examples of the method, apparatuses, and non-transitory computer-readable medium described herein, the downlink channel includes a PDCCH.

Some examples of the method, apparatuses, and non-transitory computer-readable medium described herein may further include operations, features, means, or instructions for transmitting, to the UE via a downlink channel, a message including downlink parameters and uplink parameters associated with the semi-persistent uplink data for an XR application, where selecting the set of parameters associated with the grant configuration may be based on the received downlink and uplink parameters.

In some examples of the method, apparatuses, and non-transitory computer-readable medium described herein, the downlink parameters or the uplink parameters, or both, include a discontinuous reception cycle, a grant periodicity, a semi-persistent scheduling periodicity, a scheduling request periodicity, or a combination thereof.

DETAILED DESCRIPTION

Figure 1:
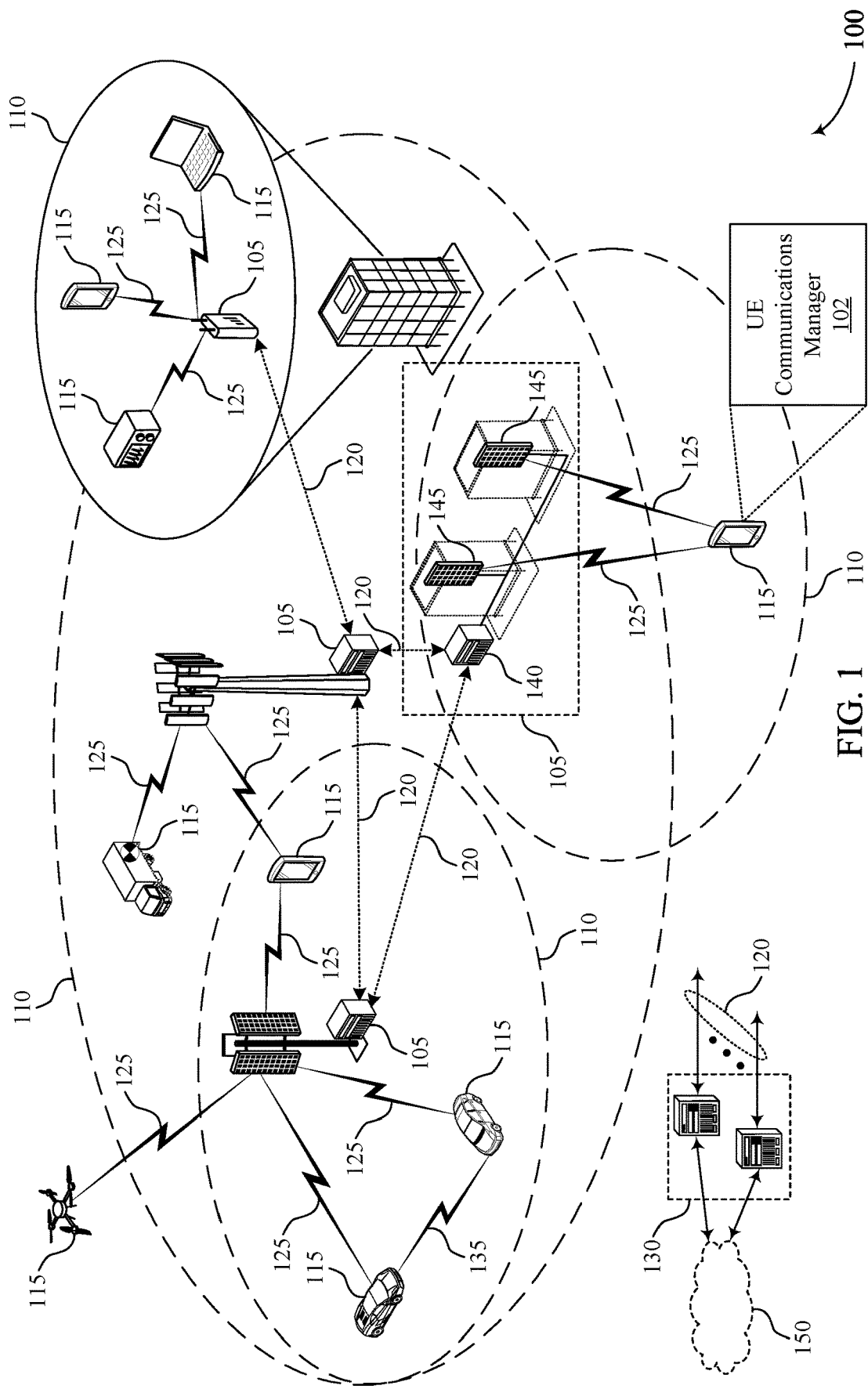
FIGS. 1 and 2 illustrate examples of wireless communications systems that support adaptive configured grant for power saving in accordance with aspects of the present disclosure.

Some wireless communication systems may include communication devices, such as UEs and base stations, for example, eNBs, next-generation NodeBs or giga-NodeBs (either of which may be referred to as a gNB) that may support multiple radio access technologies. Examples of radio access technologies include 4G systems such as LTE systems and 5G systems which may be referred to as NR systems. A UE may support various types of applications, such as XR applications, which may have periodic or semi-periodic data traffic. The applications may be hosted by a server as described herein. The server may transmit the periodic or semi-periodic data traffic to a base station, which may forward the data traffic to the UE. The base station may forward the data traffic to the UE using multiple TBs (also referred to as a burst of TBs).

In XR applications, features from the real and virtual environments may be overlaid and displayed to a user for consumption via the UE. To avoid visual conflicts, such as misaligning objects from the real and virtual environments, and other visual conflicts, the UE may sense, generate, and send pose information to a network (e.g., a base station, a server hosting the XR application). The pose information may define a position and orientation of the UE (or user) in space relative to the real and virtual environments. The UE may send the pose information and/or other control information in accordance with a configured grant. A configured grant may allocate resources (also referred to as configured grant resources), which the UE may use for downlink reception or uplink transmission, or both. The configured grant may be activated according to one or more schemes. In some examples, the base station may activate the configured grant (e.g., a configured grant type 1) for the UE by RRC signaling. In some other examples, the base station may activate or deactivate the configured grant (e.g., a configured grant type 2) for the UE by RRC signaling and L1/L2 control signaling (e.g., MAC-CE signaling).

A configured grant may, in some cases, configure the UE with a single set of parameters to use when transmitting the pose information and/or other control information to the network. However, in some cases, channel conditions (e.g., a link quality) between the UE and the network may change and these set of parameters may no longer be appropriate to use when communicating with the network. Because the UE operates in accordance with the single set of parameters provided in the configured grant, the UE does not posses any mechanism to adapt with the changing channel conditions to improve reliability and decrease latency for XR applications. Various aspects of the present disclosure relate to configuring the UE with a configured grant including multiple set of parameters, and the UE may select a set of parameters from the configured grant based on a channel condition. Thus, the UE may adapt to changing channel conditions, which may result in improved reliability for XR applications and reduced power consumption for the UE.

In some examples, the UE may be configured to signal to the network the selected set of parameters and their corresponding parameter values. For example, the UE may be configured to signal the selected set of parameters over semi-static signaling (e.g., RRC messaging) or dynamic signaling (e.g., MAC-CE messaging, or the like). In some examples, for dynamic signaling, the UE multiplexes the message carrying the dynamic indication of the selected set of parameters with a current uplink data transmission. In some examples, the network may signal to the UE to select the set of parameters based on channel status feedback from the UE, or a measurement report from the UE, etc.

Aspects of the subject matter described in this disclosure may be implemented to realize one or more of the following potential improvements, among others. The techniques employed by the UE may provide benefits and enhancements to the operation of the UE. For example, operations performed by the UE may provide power saving improvements to the UE. In some examples, configuring the UE to select a set of parameters based on a channel condition may reduce power consumption by the UE. In some other examples, configuring the UE to select a set of parameters based on a channel condition may promote higher reliability and lower latency XR-related operations, among other benefits.

Aspects of the disclosure are initially described in the context of wireless communications systems. Aspects of the disclosure are further illustrated by and described with reference to apparatus diagrams, system diagrams, and flowcharts that relate to adaptive configured grant for power saving.

FIG. 1 illustrates an example of a wireless communications system 100 that supports adaptive configured grant for power saving in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode). A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

The base station 105 and the UE 115 may support various types of applications that may have periodic or semi-periodic data traffic. The base station 105 may be in wireless communication with a server (not shown), which may provide the periodic or semi-periodic data traffic to the base station 105 to forward to the UE 115. The server may be a cloud server, a server associated with an application subscription provider, proxy server, web server, application server, or any combination thereof. The server may include an application distribution platform. The application distribution platform may allow the UE 115 to discover, browse, share, and download applications via the base station 105, and therefore provide a digital distribution of the application from the application distribution platform. As such, a digital distribution may be a form of delivering content such as data, without the use of physical media but over online delivery mediums, such as the Internet. For example, the UE 115 may upload or download applications for streaming, downloading, uploading, or processing, data (e.g., images, audio, video). The server may also transmit to the UE 115 a variety of information, such as instructions or commands to download applications on the UE 115 via the base station 105.

By way of example, the base station 105 and the UE 115 may support XR applications, which may have periodic or semi-periodic XR data traffic. An XR application may support various frame rates, for example 60 MHz frame rates or 120 MHz frame rates. The server may generate an XR frame at 60 MHz, which may correspond to a periodicity of 16.67 ms. Alternatively, the server may generate an XR frame at 120 MHz, which may correspond to a periodicity of 8.33 ms. The server may transmit the periodic or semi-periodic XR data traffic to the base station 105, which may forward the XR data traffic to the UE 115. The server may divide the XR data traffic into multiple slices (also referred to as files) and encode each slice separately, and transmit the encoded slices to the base station 105, which may forward the XR data traffic to the UE 115 using multiple TBs (also referred to as a burst of TBs).

For XR applications features from the real and virtual environments may be overlaid and displayed to a user for consumption via the UE 115. To avoid visual conflicts, such as misaligning objects from the real and virtual environments, among other visual conflicts, the UE 115 may generate and send pose information to a network (e.g., a server hosting the XR application). The pose information may define a position and orientation of the UE 115 (or user) in space relative to the real and virtual environments. In some cases, different applications may have different uplink data flows.

For VR applications there may be a single uplink data flow. For example, the UE 115 may generate pose information (e.g., six degree of freedom (6DOF) pose information) and other control information. In some examples, the UE 115 may generate or transmit the pose information based on a data rate (e.g., 0.5-2 Mbps). The UE 115 may transmit the pose information and other control information based on an uplink transmit periodicity (e.g., 2 mn (500 Hz)). In some examples, the pose information and other control information may have different file sizes (e.g., 0.5 Mbit/500=1 Kbit=125 byte, 2 Mbit/500=4 Kbit=500 byte). An FDP may be 1.25 ms to 10 ms.

For AR applications there may be two uplink data flows. As part of the first uplink data flow, the UE 115 may generate pose information (e.g., 6DOF pose information) and control information. The UE 115 may generate or transmit the pose information based on a data rate (e.g., 0.5-2 Mbps). The UE 115 may transmit the pose information and other control information based on an uplink transmit periodicity (e.g., 2 mn (500 Hz)). Similarly, for the AR applications, the FDP may be 1.25 ms to 10 ms. As part of the second uplink data flow, the UE 115 may generate pose information for a scene update associated with the AR applications. For scene updates, the UE 115 may generate or transmit the pose information based on a data rate (e.g., 10 Mbps at 10 Hz). In some examples, the pose information may have different file sizes (e.g., 1 Mbits per 100 ms=125 kbyte). An FDB may be 100 ms.

The UE 115 may benefit from the periodic or semi-periodic data traffic, and more specifically from the transmission delay between bursts of TBs carrying the periodic or semi-periodic data traffic to implement various operations to reduce power consumption. The UE 115 may send the pose information and/or other control information in accordance with a configured grant, which, in some cases, may configure the UE 115 with a single set of parameters to use when transmitting the pose information and/or other control information to the network. However, in some cases, channel conditions (e.g., a link quality) between the UE 115 and the network may change and these set of parameters may no longer be appropriate to use when communicating with the network. Because the UE 115 operates in accordance with the single set of parameters provided in the configured grant, the UE 115 does not posses any mechanism to adapt with the changing channel conditions to improve reliability and decrease latency for XR applications.

Various aspects of the present disclosure relate to configuring the UE 115 with a configured grant including multiple set of parameters, and the UE 115 may, via a UE communication manager 102, select a set of parameters from configured grant based on a channel condition. Thus, the UE 115 may adapt, via a UE communication manager 102, to changing channel conditions, which may result in improved reliability for XR applications and reduced power consumption for the UE 115. In some examples, the UE 115 may be configured to signal, via a UE communication manager 102, to the network the selected set of parameters and their corresponding parameter values. For example, the UE 115 may be configured to signal the selected set of parameters over semi-static signaling (e.g., RRC messaging) or dynamic signaling (e.g., MAC-CE messaging, or the like). In some examples, for dynamic signaling, the UE 115 multiplexes, via a UE communication manager 102, the message carrying the dynamic indication of the selected set of parameters with a current uplink data transmission. In some examples, the network may signal to the UE 15 to select the set of parameters based on channel status feedback from the UE, or a measurement report from the UE 115, etc.

A UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a PMI or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
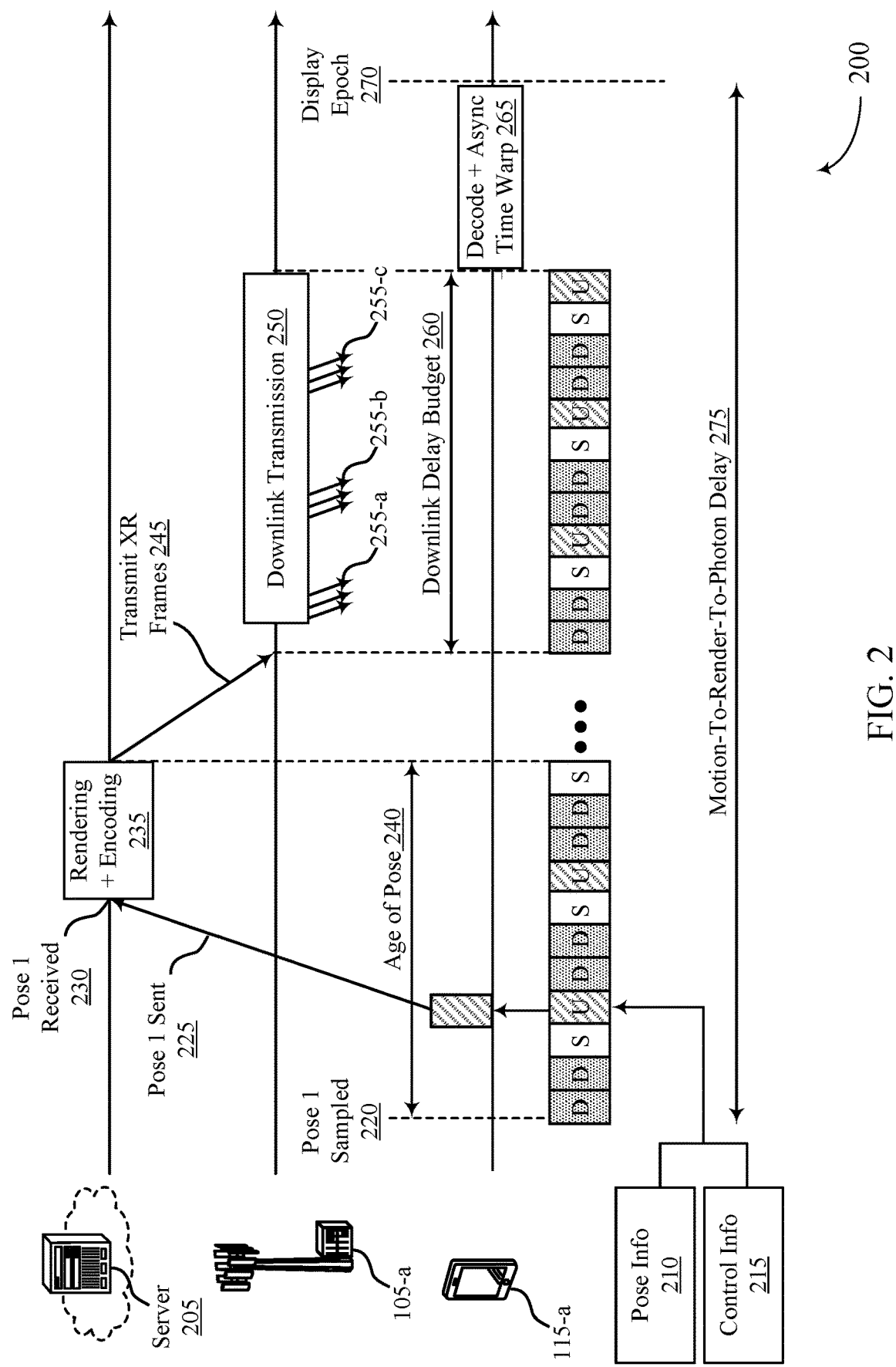

FIG. 2 illustrates an example of a wireless communications system 200 that supports adaptive configured grant for power saving in accordance with aspects of the present disclosure. The wireless communications system 200 may implement or be implemented by one or more aspects of the wireless communications system 100. For example, the wireless communications system 200 may include a base station 105-a and a UE 115-a, which may be examples of a base station 105 and a UE 115 as described herein. The wireless communications system 200 may also include a server 205, which may be examples of a server as described herein. The wireless communications system 200 may support multiple radio access technologies including 4G systems such as LTE systems, LTE-A systems, or LTE-A Pro systems, and 5G systems, which may be referred to as NR systems. The wireless communications system 200 may include features for improvements to power savings and, in some examples, may promote high reliability and low latency uplink operations for power saving, among other benefits.

In the example of FIG. 2, the base station 105-a and the UE 115-a may support various types of applications that may have periodic or semi-periodic data traffic. The base station 105-a may be in wireless communication with the server 205, which may provide the periodic or semi-periodic data traffic to the base station 105-a to forward to the UE 115-a. The server 205 may be a cloud server, a server associated with an application subscription provider, proxy server, web server, application server, or any combination thereof. The server 205 may include an application distribution platform. The application distribution platform may allow the UE 115-a to discover, browse, share, and download applications via the base station 105-a, and therefore provide a digital distribution of the application from the application distribution platform. As such, a digital distribution may be a form of delivering content such as data, without the use of physical media but over online delivery mediums, such as the Internet. For example, the UE 115-a may upload or download applications for streaming, downloading, uploading, or processing, data (e.g., images, audio, video). The server 205 may also transmit to the UE 115-a a variety of information, such as instructions or commands to download applications on the UE 115-a via the base station 105-a.

By way of example, the base station 105-a and the UE 115-a may support XR applications, which may have periodic or semi-periodic XR data traffic. For XR-related applications, the UE 115-a may generate and send pose information 210, as well as other control information 215 to the server 205 (e.g., a server hosting the XR application) via the base station 105-a. The pose information 210 may define a pose, a posture, a position, an orientation, or a movement of the UE 115-a (or a user of the UE 115-a), and may be acquired via imaging devices including head-mounted units (HMUs), head-mounted displays (HMDs), external imaging devices, or any combination thereof. The pose information 210 may thereby include data regarding the freedom of movement of the UE 115-a (or the user), and may be characterized by six degrees of freedom in which a user/object may change position (e.g., translation upwards/downwards, translation left/right, translation forwards/backwards, pitch, yaw, roll). The control information 215 may refer to other inputs or commands input by a user, such as movement/commands with a joystick, controller, or other device. The UE 115-a may additionally acquire scene information. The scene information may include images and/or video of a surrounding physical or virtual environment, and may be acquired in the context of XR applications along with the pose information 210 or the control information 215, or both.

With reference to FIG. 2, the UE 115-a may, at 220, sample the pose information 210, the control information 215, the scene information, or any combination thereof. The UE 115 may thereby acquire information, at 230, which is to be transmitted to the server 205 and/or the base station 115-a. For example, the UE 115-a may sample Pose 1 at 230. In some examples, the pose information 210 and the control information 215 may be acquired (e.g., sampled) at a data rate of approximately 0.5-2 Mbps, and may be transmitted to the server 205 approximately ever 2 ms (e.g., 500 Hz). Additionally, the pose information 210, the control information 215, or both, may be sampled and/or transmitted with a file size of 1 Kbit (e.g., 125 bytes), or 4 Kbit (e.g., 500 bytes). Comparatively, the scene information may be acquired (e.g., sampled) at a data rate of approximately 10 Mbps, and may be transmitted to the server 205 at a rate of 10 Hz. Additionally, the scene information may be sampled and/or transmitted with a file size of 1 Mbits per 100 ms (e.g., 125 Kbytes).

At 225, the UE 115-a may transmit the sampled information (transmit Pose 1 225) to the server 205. In some aspects, the UE 115-a may transmit the sampled information within the first uplink symbol following the time in which the information (e.g., the pose information 210, the control information 215, scene information) was sampled. At 230, the sampled information may be received at the server 205. At 235, the server 205 may render and encode a new XR frame based on (e.g., according to) the received information (Pose 1). In some aspects, XR frames may be generated periodically, and may be divided into multiple slices that are encoded separately. As shown in FIG. 2, the age of acquired information (e.g., age of pose 240) may be defined as the duration between when the information was sampled (e.g., Pose 1 sampled at 220) and when the XR is rendered and/or encoded at the server 205.

At 245, the XR frame may be transmitted to the base station 105-a. In some aspects, each encoded slide (of file) of the XR frame may be transmitted from the server 205 to the base station 105-a separately. At 250, the base station 105-a may transmit the received XR frames to the UE 115-a. In some aspects, the slices of the XR frame may be transmitted through multiple TBs, or a burst of TBs, to the UE 115-a. For example, as will be discussed in further detail herein with respect to FIG. 3, the base station 105-a may transmit data to the UE 115-a via XR frame bursts 255 (e.g., first XR frame burst 255-a, second XR frame burst 255-b, and third XR frame burst 255-c). Each XR frame burst 255 may have a transmission delay requirement, and the downlink transmission from the base station 105-a to the UE 115-a may be characterized by a downlink delay budget 260. At 265, the UE 115-a may decode the data received from the base station 105-a (e.g., decode XR frame bursts 255) and perform asynchronous time warp procedures. Subsequently, at 270, the received XR frames may be displayed at the UE 115-a. The example of FIG. 2 may depict a delay (e.g., a motion-to-render-to-photon delay 275) from motion to rendering to photon.

The transmission of the pose information 210 and/or other control information by the UE 115-a, in some cases, may occur at periodicity different from a periodicity of the XR frame bursts 255, and result in wasted power consumption. For example, the UE 115-a may transmit the pose information 210 to the server 205 and/or the base station 105-a according to a configured grant, which may define a set of parameters (e.g., MCS, TBS, etc.) for the UE 115-*a* to use for the transmission of the pose information 210 and other control information to the server 205 and/or the base station 105-*a*. In some cases, however, channel conditions may vary between the UE 115-*a* and the server 205 and/or the base station 105-*a*. This retransmission may thus add unwanted latency for the XR application. The UE 115-*a* may retransmit the pose information 210 and other control information multiple times because the UE 115-*a* is configured to use the same set of parameters and channel conditions may not have improved where the set of parameters are sufficient for the retransmission.

In the wireless communication system 200, the UE 115-*a* may be configured with a configured grant carrying multiple set of parameters. The UE 115-*a* may thereby be configured to select a set of parameters based on a channel condition to experience power saving improvements. In other words, the UE 115-*a* may adapt to changing channel conditions, which may result in improved reliability for XR applications and reduced power consumption for the UE 115. In some examples, the UE 115 may dynamically indicate the selected set of parameters for a semi-persistent uplink data transmission (also referred to as a configured grant transmission). In some other examples, the UE 115 may directly indicate parameter values of the selected set of parameters. For example, the UE 115 may transmit an indication, to the base station 105 or the server 205, or both, an MCS index value, a TBS index value, an antenna port, a PMI index value, a number of layers, etc.

The UE 115 may transmit the dynamic indication (e.g., an uplink control information (UCI)) via an uplink control channel, such as a PUCCH. The PUCCH resource may be pre-allocated and associated with a configured grant resource. The PUCCH resource may have a same or different periodicity with the associated configured grant resource. Alternatively, the UE 115 may transmit the dynamic indication via a MAC-CE message (also referred to as MAC-CE) through the current configured grant transmission and applied from the next configured grant transmission. To transmit through the current configured grant transmission, the MAC-CE may be multiplexed with current uplink data. In some other examples, the UE 115 may transmit the dynamic indication via an RRC message to indicate its preferred parameters sets or values.

The server 205 (e.g., XR server) may adaptively change its transmission rate (e.g., frames per second, frame quality/resolution) depending on a channel condition or buffer status, or both. If the base station 105 determines that an average channel condition for the UE 115 degrades, then the base station 105 may provide feedback to the server 205 to reduce its transmission rate. The base station 105 can use downlink buffer status, a channel status feedback from the UE 115, or measurement report from the UE 115, or the like, to identify whether a channel to the UE 115 degrades. If the UE's 115 XR application receive rate (e.g., frames per second, frame quality/resolution) falls below a certain threshold, then the UE 115 can provide feedback to the server 205 or the base station 105, or both, to adjust its transmission rate.

The base station 105 may adjust its grant configuration to adapt to the adjusted rate change in application layer. The base station 105 may thereby transmit, to the UE 115, a DCI message (in a downlink control channel (e.g., a PDCCH)) or a MAC-CE message to update or reactivate with parameters in the configured grant configuration. The UE 115 may update a periodicity, a repetition factor value, or a number of slots allocated in a configured grant, or any combination thereof, based on the received message from the base station 105. The UE 115 may transmit, and the base station 105 may receive, a MAC-CE indicating one or both of an activation or a deactivation of one or more configured grants or a group of configured grants. The MAC-CE may include a sequence of bits, where each bit corresponds to either a configured grant or a group of configured grants configured via RRC signaling. The UE 115 may transmit the MAC-CE to the base station 105 to indicate which configured grant is to be activated or not, or to which group of configured grants to switch to. As such, the UE 115 may dynamically transmit, to the base station 105, a MAC-CE to update or reactivate one or more parameters associated with a configured grant configuration. For example, the one or more parameters may include one or more offsets for one or more configured grants, a periodicity, a repetition factor value (e.g., repK), a number of slots allocated in a configured grant periodicity, an indication for an activation and/or a deactivation of one or more configured grants or a group of configured grants.

For power saving, downlink reception and uplink transmission can be synchronized, so that the UE 115 may receive downlink frame and send uplink pose information simultaneously or proximate in time. In some examples, if a number of frames generated per second is changed from the server 205 (encoder) for adaption, then the base station 105 can also change its physical layer parameter to adapt its resource to match with the reduced frame rates. This adaptation could reduce waste of radio resource and reduce power consumption. The following downlink and uplink resource and/or parameters at the base station 105 may be related to XR frame generation rate: a discontinuous reception cycle, a grant periodicity, a semi-persistent scheduling periodicity, a scheduling request periodicity, or a combination thereof. Using downlink signaling, the base station 105 may jointly indicate downlink and uplink resource and/or parameters to adapt to newly adjusted frame generation rate in application layer. The set of parameter lists/values are pre-configured, and the base station 105 may indicate which one to apply dynamically.

Figure 3:
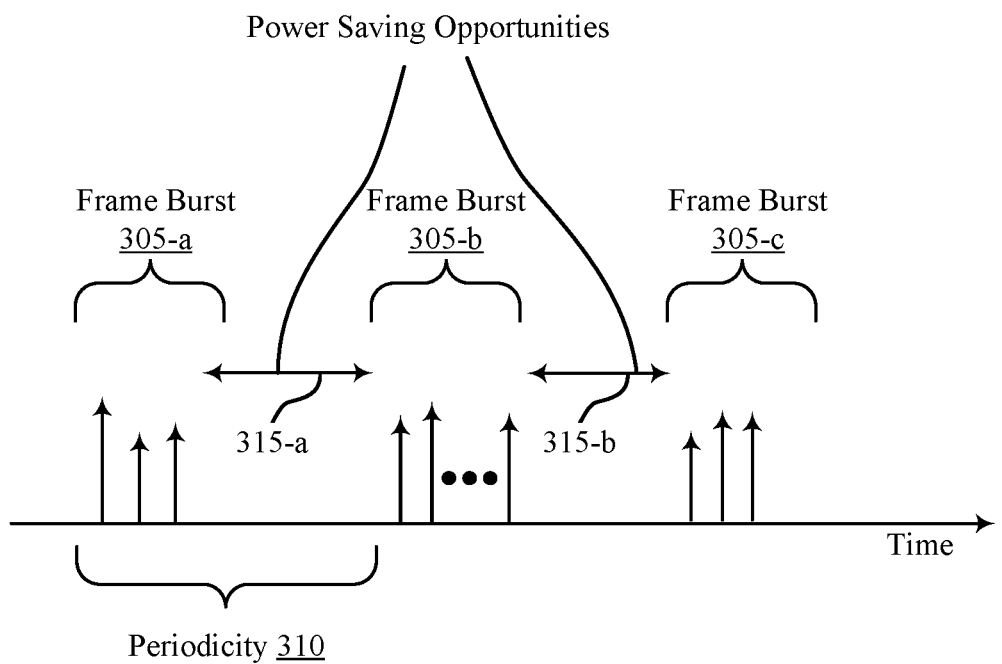
FIG. 3 illustrates an example of a downlink and uplink configuration that supports adaptive configured grant for power saving in accordance with aspects of the present disclosure.

FIG. 3 illustrates an example of a downlink and uplink configuration 300 that supports adaptive configured grant for power saving in accordance with aspects of the present disclosure. The downlink and uplink configuration 300 may implement or may be implemented by aspects of the wireless communications systems 100 and 200 as described with reference to FIGS. 1 and 2. respectively. The downlink and uplink configuration 300 may be based on a configuration by a base station 105, and implemented by a UE 115. The downlink and uplink configuration 300 may configure time resources (e.g., symbols, minislots, slots) as well as frequency resources (e.g., carriers, subcarriers). The downlink and uplink configuration 300 may support multiple radio access technologies including 4G systems such as LTE systems, LTE-A systems, or LTE-A Pro systems, and 5G systems which may be referred to as NR systems.

The base station 105 may transmit, and the UE 115 may receive, one or more frame bursts 305 carrying one or more frames associated with an application. For example, the base station 105 may transmit, and the UE 115 may receive, one or more XR frame bursts carrying one or more XR frames associated with an XR application. A frame may be divided into multiple slices that may be separately encoded. The base station 105 may transmit the encoded slices over the air through multiple TBs (a burst of TBs). In some examples, the base station 105 may transmit the frame bursts 305 according to a periodicity 310 (e.g., a frame generation periodicity), which may be based on a frame rate of an application, such as an XR application (e.g., a 60 Hz or 120 Hz frame rate, which provide a frame generation periodicity of 16.67 ms or 8.33 ms, respectively). The UE 115 may thereby receive the frame bursts 305 based on the periodicity 310. In the example of FIG. 3, there may be one or more power saving opportunities 315 between the frame bursts 305 for the UE 115 to experience added power savings.

The UE 115 may determine one or more power saving opportunities 315 between the frame bursts 305 based at least in part on the periodicity 310. For example, the UE 115 may determine a power saving opportunity 315-*a* between two consecutive frame bursts (e.g., the frame burst 305-*a* and the frame burst 305-*b*). Additionally or alternatively, the UE 115 may determine a power saving opportunity 315-*b* between two other consecutive frame bursts (e.g., the frame burst 305-*b* and the frame burst 305-*c*). In some cases, however, the UE 115 may be unable to experience added power savings associated with the one or more power saving opportunities 315 because a configured grant periodicity may be different than a downlink traffic periodicity (e.g., frame bursts 305). In some other cases, the UE 115 may be unable to experience added power savings associated with the one or more power saving opportunities 315 because of uplink retransmission (e.g., retransmission of pose information and/or control information) due to changes in channel conditions, which results in wasted power consumption. The one or more power saving opportunities 315 between the frame bursts 305 thus are unused. To benefit from the power saving opportunities 315, the UE 115 may be configured with a configured grant that includes multiple set of parameters, and the UE 115 may select a set of parameters from the configured grant based on a channel condition. Thus, the UE 115 may adapt to changing channel conditions, which may result in improved reliability for XR applications and reduced power consumption for the UE 115.

Figure 4A:
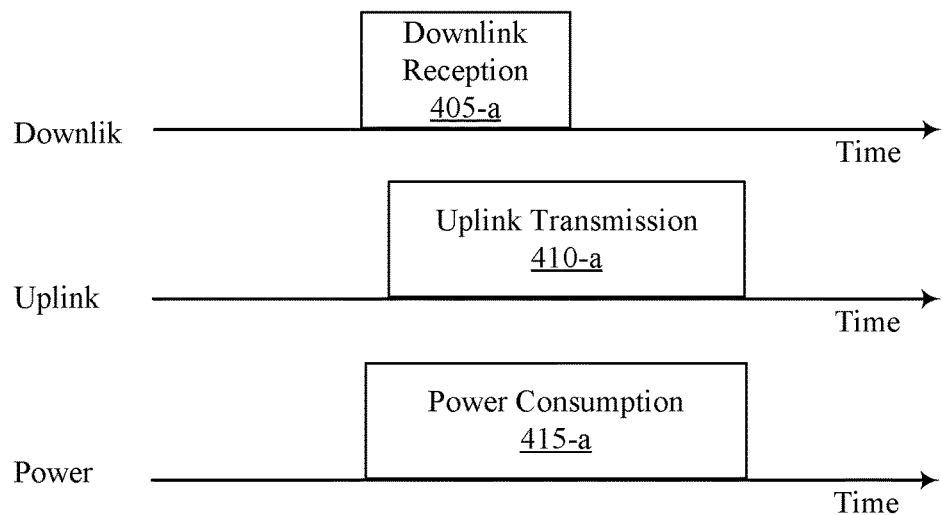
FIGS. 4A and 4B illustrate examples of transmission configurations that support adaptive configured grant for power saving in accordance with aspects of the present disclosure.

FIG. 4A illustrates an example of a transmission configuration 400-*a* that supports adaptive configured grant for power saving in accordance with aspects of the present disclosure. The transmission configuration 400-*a* may implement aspects of the wireless communications system 100 and 200 described with reference to FIGS. 1 and 2, respectively. For example, the transmission configuration 400-*a* may be based on a configuration by a base station 105 and implemented by a UE 115. In the example of FIG. 4A, the base station 105 may transmit, and the UE 115 may receive, a grant configuration. For example, the base station 105 may transmit, and the UE 115 may receive, a grant configuration via an RRC procedure. The base station 105 may thereby transmit, and the UE 115 may receive, an RRC message carrying the grant configuration. The configured grant may include a single set of parameters (e.g., an MCS, a TBS, and the like) for the UE 115 to use for downlink reception and uplink transmissions.

In the example of FIG. 4A, once the configured grant is activated by the base station 105 (e.g., via a DCI message) or the UE 115, or both, the configured grant does not change until it is deactivated or reactivated. This static configured grant may result in added power consumption and other unnecessary resource usage for the base station 105 or the UE 115, or both. For example, in some cases, the base station 105 or the UE 115, or both, may determine a change in channel conditions (e.g., a link quality) between the base station 105 and the UE 115, which may negatively impact downlink reception 405-*a* and uplink transmission 410-*a* (e.g., semi-static uplink transmissions) for the UE 115. As a result, the UE 115 may have to retransmit an uplink transmission to the base station 105. For example, the UE 115 may retransmit uplink control or data using the same single set of parameters. Thus, the uplink transmission 410-*a* is extended due to retransmission. In some cases, retransmission may not be effective for the base station 105 or the UE 115, or both. For example, in XR applications, retransmissions may be unfavorable and may negatively impact user experience because, in XR applications, uplink transmissions (e.g., carrying pose information and/or control information) has to occur with relatively low latency in order to reduce power consumption (e.g., decrease power level 415-*a*).

Figure 4B:
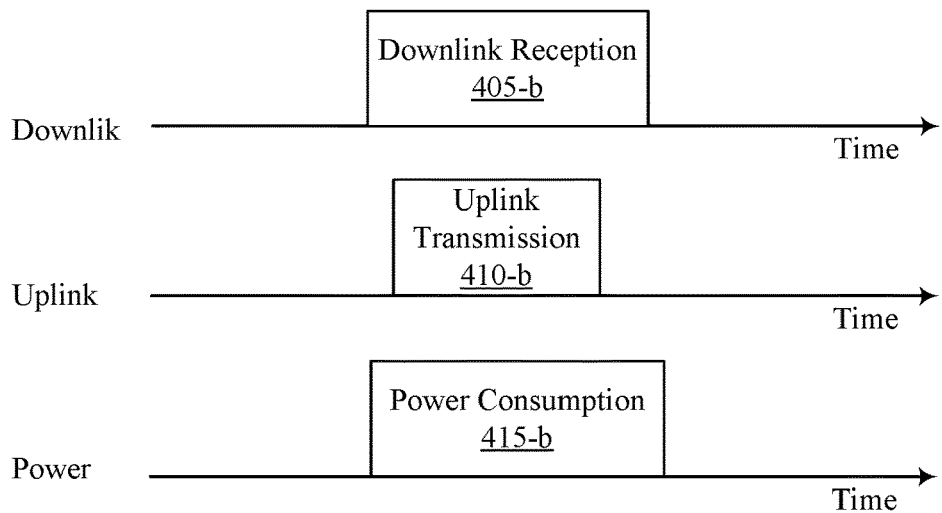

FIG. 4B illustrates an example of a transmission configuration 400-*b* that supports adaptive configured grant for power saving in accordance with aspects of the present disclosure. The transmission configuration 400-*b* may be based on a configuration by a base station 105 and implemented by a UE 115 to promote power saving for the UE 115 by selecting a set of parameters based on a channel condition between the base station 105 and the UE 115. The transmission configuration 400-*b* may also be based on a configuration by the base station 105 and implemented by the UE 115 to promote high reliability and low latency semi-persistent uplink operations, among other benefits. In the example of FIG. 4B, the base station 105 may transmit, and the UE 115 may receive, a grant configuration. For example, the base station 105 may transmit, and the UE 115 may receive, a grant configuration via an RRC procedure. The base station 105 may thereby transmit, and the UE 115 may receive, an RRC message carrying the grant configuration. The configured grant may include multiple set of parameters (e.g., an MCS, a TBS, and the like) for the UE 115 to use for downlink reception and uplink transmissions.

Similarly to FIG. 4A, the base station 105 or the UE 115, or both, may determine a change in a link quality between the base station 105 and the UE 115, which may negatively impact downlink reception 405-*b* and uplink transmission 410-*b* (e.g., semi-static uplink transmissions) for the UE 115. As a result, the UE 115 may have to retransmit the uplink transmission 410-*b* to the base station 105. In the example of FIG. 4B, however, the UE 115 may select a different set of parameters from the configured grant to adapt to the change in link quality between the base station 105 and the UE 115. For instance, the different set of parameters may have a different MCS value, TBS value, etc. The UE 115 may thereby use the selected set of parameters for the retransmission of the uplink transmission 410-*b* to improve reliability of the retransmission, which may result in a lower latency retransmission and reduced power consumption 415-*b* for the UE 115.

Figure 5:
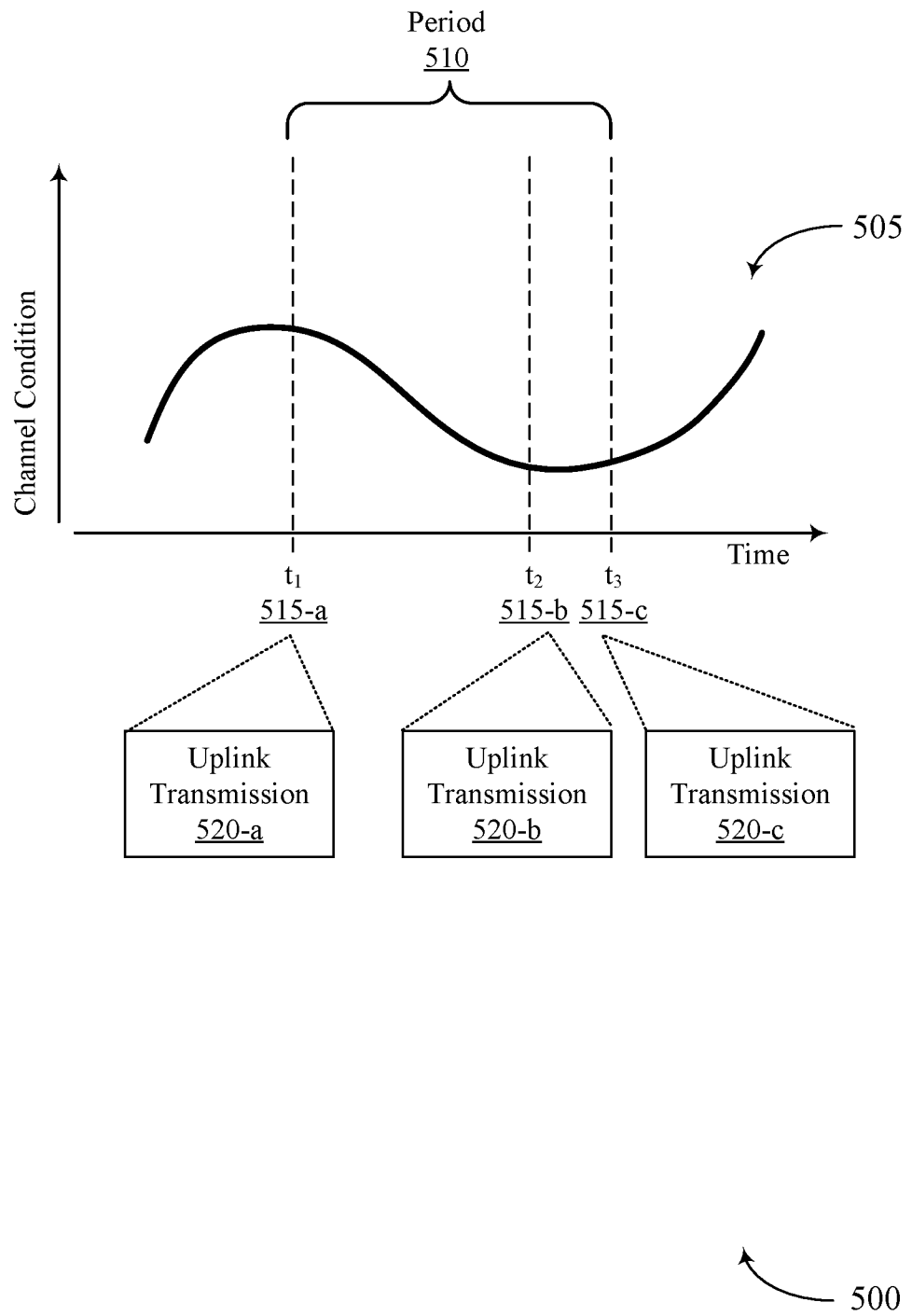
FIG. 5 illustrates an example of a timeline that supports adaptive configured grant for power saving in accordance with aspects of the present disclosure.

FIG. 5 illustrates an example of a timeline 500 that supports adaptive configured grant for power saving in accordance with aspects of the present disclosure. The timeline 500 may implement or be implemented by one or more aspects of the wireless communications system 100 and 200 described with reference to FIGS. 1 and 2, respectively. The timeline 500 may be based on a configuration by a base station 105 and implemented by a UE 115 to promote power saving for the UE 115 by selecting a set of parameters based on a channel condition between the base station 105 and the UE 115. The timeline 500 may also be based on a configuration by the base station 105 and implemented by the UE 115 to promote high reliability and low latency semi-persistent uplink operations, among other benefits.

With reference to the timeline 500, a channel condition 505 between the base station 105 and the UE 115 may vary over a period 510. For example, the channel condition 505 may correspond to a first channel quality level at a first time instance 515-*a*, a second channel quality level at a second time instance 515-*a*, and a third channel quality level at a third time instance 515-*a*. Because the channel condition 505 between the base station 105 and the UE 115 varies over the period 510, it may be beneficial for the UE 115 to adapt to the changing channel condition 505 to maintain high reliability and low latency uplink operations. By way of example, the UE 115 may select a first set of parameters for an uplink transmission 520-*a* during a first time instance 515-*a*. The first set of parameters may include one or more parameters each having a particular value when the channel condition 505 corresponds to, for example a certain channel link quality, a path loss, or the like. For example, the first set of parameters may have a repetition factor value of one, an MCS index value of 14, and a TBS index value of 200 (i.e., first set or parameters={repK=1, MCS=14, TBS=200}. Additionally, or alternatively, the UE 115 may use one or more other parameters as described herein.

The UE 115 may select a second set of parameters for an uplink transmission 520-*b* or an uplink transmission 520-*c*, or both, during the second time instance 515-*b* or the third time instance 515-*c*, or both. The second set of parameters may include one or more parameters each having a particular value when the channel condition 505 corresponds to a different channel link quality, a path loss, or the like. For example, the second set of parameters may have a repetition factor value of two, an MCS index value of 10, and a TBS index value of 100 (i.e., second set or parameters={repK=2, MCS=10, TBS=100}. Additionally, or alternatively, the UE 115 may use one or more other parameters as described herein. The UE 115 may, in some examples, use the same set of parameters for the uplink transmission 520-*b* and the uplink transmission 520-*c* because the channel condition 505 may be the same during the second time instance 515-*b* and the third time instance 515-*c*. Alternatively, the UE 115 may use the same set of parameters for the uplink transmission 520-*b* and the uplink transmission 520-*c* because the channel condition 505 may be within a threshold (e.g., a degradational level threshold) between the second time instance 515-*b* and the third time instance 515-*c*.

The UE 115 may transmit, to the base station 105, one or more of the uplink transmissions 520, and the base station 105 may blindly detect the uplink transmissions 520. The base station 105 may blindly detect the uplink transmissions 520 based on possible parameters configurations. That is, the base station 105 may blindly detect the uplink transmissions 520 based on the multiple set of parameters the base station 105 configured the UE 115 to use for the uplink transmissions 520 in view of the changing channel condition 505. Therefore, the UE 115 may be configured with a configured grant that includes multiple set of parameters, and the UE 115 may dynamically select a set of parameters from the configured grant based on the channel condition 505. Thus, the UE 115 may adapt to changing channel condition 505, which may result in reduced power consumption for the UE 115.

Figure 6:
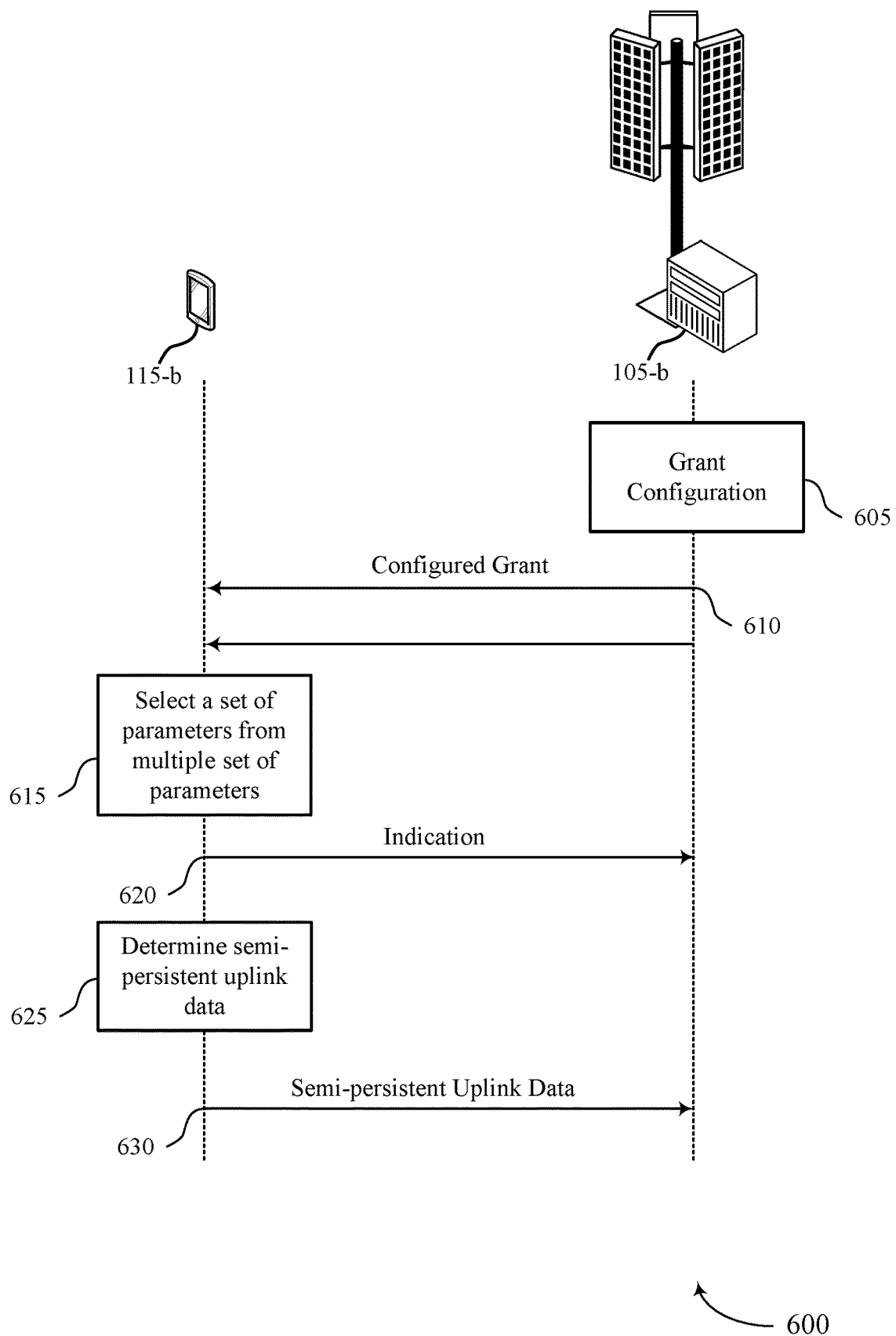
FIG. 6 illustrates an example of a process flow that supports adaptive configured grant for power saving in accordance with aspects of the present disclosure.

FIG. 6 illustrates an example of a process flow 600 that supports adaptive configured grant for power saving in accordance with aspects of the present disclosure. The process flow 600 may implement or be implemented by one or more aspects of the wireless communications system 100 and the wireless communications system 200 described with reference to FIGS. 1 and 2, respectively. The process flow 600 may be based on a configuration by a base station 105-*b* and implemented by a UE 115-*b* to promote power saving for the UE 115-*b* by selecting a set of parameters based on a channel condition between the base station 105-*b* and the UE 115-*b*. The process flow 600 may also be based on a configuration by the base station 105-*b* and implemented by the UE 115-*b* to promote high reliability and low latency semi-persistent uplink operations (e.g., transmission of position information and control information of the UE 115-*b* for an XR application), among other benefits. In the following description of the process flow 600, the operations between the base station 105-*b* and the UE 115-*b* may be transmitted in a different order than the example order shown, or the operations performed by the base station 105-*b* and the UE 115-*b* may be performed in different orders or at different times. Some operations may also be omitted from the process flow 600, and other operations may be added to the process flow 600. The base station 105-*b* and the UE 115-*b* may be examples of a base station 105 and a UE 115 as described with reference to FIGS. 1 and 2, respectively.

At 605, the base station 105-*b* may determine a grant configuration for the UE 115-*b*. The grant configuration may include multiple set of parameters. Each set of parameters may include one or more parameters for semi-persistent uplink data. The one or more parameters may include downlink parameters and uplink parameters associated with the semi-persistent uplink data, for example, for an XR application. For example, the base station 105-*b* may transmit, via downlink signaling (e.g., RRC, MAC-CE, DCI), jointly downlink parameters and uplink parameters associated with the semi-persistent uplink data to adapt a frame generation rate in an application layer associated with the UE 115-*b*. Using downlink signaling, the base station 105-*b* may jointly indicate downlink and uplink resource and/or parameters to adapt to newly adjusted frame generation rate in application layer. The set of parameter lists/values are pre-configured, and the base station 105-*b* may indicate which one to apply dynamically.

In some examples, each set of parameters may include different values for the one or more parameters, for example, based on a channel condition. That is, the base station 105-*b* may assign a set of parameters to include one or more parameters each having a particular value when a channel condition corresponds to a certain channel condition (e.g., a channel link quality, a path loss, or the like). For example, the base station 105-*b* may assign a repetition factor value, an MCS index value, a TBS index value, a number of layers, a number of antenna ports, a PMI index value, or any combination thereof, based on a particular channel condition. Additionally or alternatively, the downlink parameters or the uplink parameters, or both, include a discontinuous reception cycle, a grant periodicity, a semi-persistent scheduling periodicity, a scheduling request periodicity, or a combination thereof. At 610, the base station 105-*b* may transmit, to the UE 115-*b*, the configured grant including the multiple set of parameters via signaling. In some examples, the signaling may include a MAC-CE message, an RRC message, or a DCI message, or a combination thereof.

At 615, the UE 115-*b* may select a set of parameters from multiple set of parameters, for example, received in the configured grant from the base station 105-*b*. For example, the UE 115-*b* may receive a set of parameters based on a channel condition between the base station 105-*b* and the UE 115-*b*. In some examples, the UE 115-*b* may determine the channel condition based on a channel link quality measurement, a path loss measurement, a channel state information measurement, etc. Based on the channel condition determination, the UE 115-*b* select a set from the multiple sets that may be appropriate for the channel condition. For example, the UE 115-*b* may select a set of parameters including one or more parameters (e.g., a repetition factor, a MCS index, a TBS index, a PMI index, etc.) each having a particular value (e.g., a repetition factor value, a MCS index value, a TBS index value, a precoding matrix index value, etc.) appropriate for the channel condition. The UE 115-*b* may thereby dynamically select a set of parameters from the multiple set of parameters related to link adaptation for a configured grant transmission (e.g., a semi-persistent uplink data transmission).

At 620, the UE 115-*b* may optionally transmit, to the base station 105-*b*, an indication of the selected set of parameters. In some examples, the UE 115-*b* may transmit, in a MAC-CE message, the indication of the one or more parameters associated with the selected set of parameters. In some examples, the UE 115-*b* may multiplex the MAC-CE message with another uplink transmission to the base station 105-*b*. In some other examples, the UE 115-*b* may transmit, in an RRC message, the indication of the one or more parameters associated with the selected set of parameters. The indication may identify one or more parameter values of the one or more parameters associated with the selected set of parameters for the configured grant transmission (e.g., a semi-persistent uplink data transmission). For example, the UE 115-*b* may transmit the indication of the one or more parameters associated with the selected set of parameters on an uplink channel (e.g., PUCCH) using one or more uplink resources. The one or more uplink resources may include one or more preconfigured PUCCH resources associated with one or more grant resources associated with the configured grant. The one or more PUCCH resources and the one or more grant resources may have a same periodicity. Alternatively, the one or more PUCCH resources and the one or more grant resources may have a different periodicity. At 625, the UE 115-*b* may determine semi-persistent uplink data to transmit to the base station 105-*b*. For example, as described herein, the UE 115-*b* may generate pose information or control information, or both, for an XR application. At 630, the UE 115-*b* may transmit the semi-persistent uplink data (e.g., configured grant transmission), to the base station 105-*b*, using the selected set of parameters.

Figure 7:
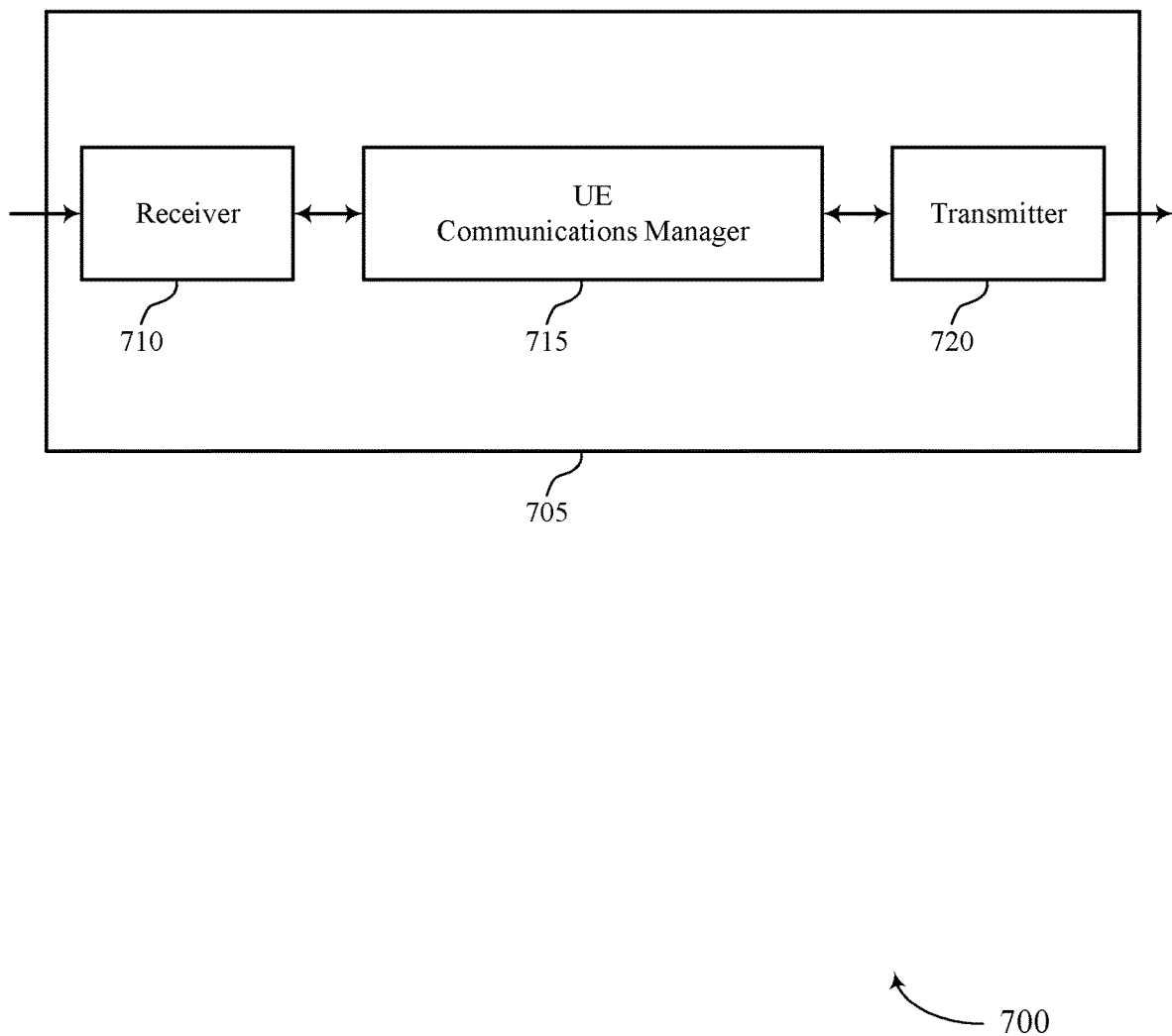
FIGS. 7 and 8 show block diagrams of devices that support adaptive configured grant for power saving in accordance with aspects of the present disclosure.

FIG. 7 shows a block diagram 700 of a device 705 that supports adaptive configured grant for power saving in accordance with aspects of the present disclosure. The device 705 may be an example of aspects of a UE 115 as described herein. The device 705 may include a receiver 710, a UE communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to adaptive configured grant for power saving, etc.). Information may be passed on to other components of the device 705. The receiver 710 may be an example of aspects of the transceiver 1020 described with reference to FIG. 10. The receiver 710 may utilize a single antenna or a set of antennas.

The UE communications manager 715 may be implemented as an integrated circuit or chipset for the device 705, and the receiver 710 and the transmitter 720 may be implemented as analog components (for example, amplifiers, filters, antennas) coupled with the device 705 modem to enable wireless transmission and reception. The actions performed by the UE communications manager 715 as described herein may be implemented to realize one or more potential advantages. The UE communications manager 715 may be an example of aspects of the UE communications manager 1010 described herein. By including or configuring the UE communications manager 715 in accordance with examples as described herein, the device 705 (e.g., a processor controlling or otherwise coupled to the receiver 710, the transmitter 720, the UE communications manager 715, or a combination thereof) may support configured grant that includes multiple set of parameters, and the UE communications manager 715 may select a set of parameters from the configured grant based on a channel condition (e.g., a channel link quality measurement, a path loss measurement, a channel state information measurement).

For example, the UE communications manager 715 may receive a grant configuration including multiple set of parameters, each set of parameters including one or more parameters for semi-persistent uplink data. The UE communications manager 715 may select a set of parameters from the multiple set of parameters based on a channel condition, and transmit, to a base station, the semi-persistent uplink data using the selected set of parameters. Based on adapting the configured grant, one or more processors of the device 705 (for example, processor(s) controlling or incorporated with the UE communications manager 715) may promote improvements to power consumption, and, in some examples, may promote enhanced efficiency for high reliability and low latency wireless communications operations, among other benefits.

The UE communications manager 715, or its sub-components, may be implemented in hardware, code (e.g., software or firmware) executed by a processor, or any combination thereof. If implemented in code executed by a processor, the functions of the UE communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 715, or its sub-components, may be physically located at various positions, including being distributed such that portions of functions are implemented at different physical locations by one or more physical components. In some examples, the UE communications manager 715, or its sub-components, may be a separate and distinct component in accordance with various aspects of the present disclosure. In some examples, the UE communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver component. For example, the transmitter 720 may be an example of aspects of the transceiver 1020 described with reference to FIG. 10. The transmitter 720 may utilize a single antenna or a set of antennas.

Figure 8:
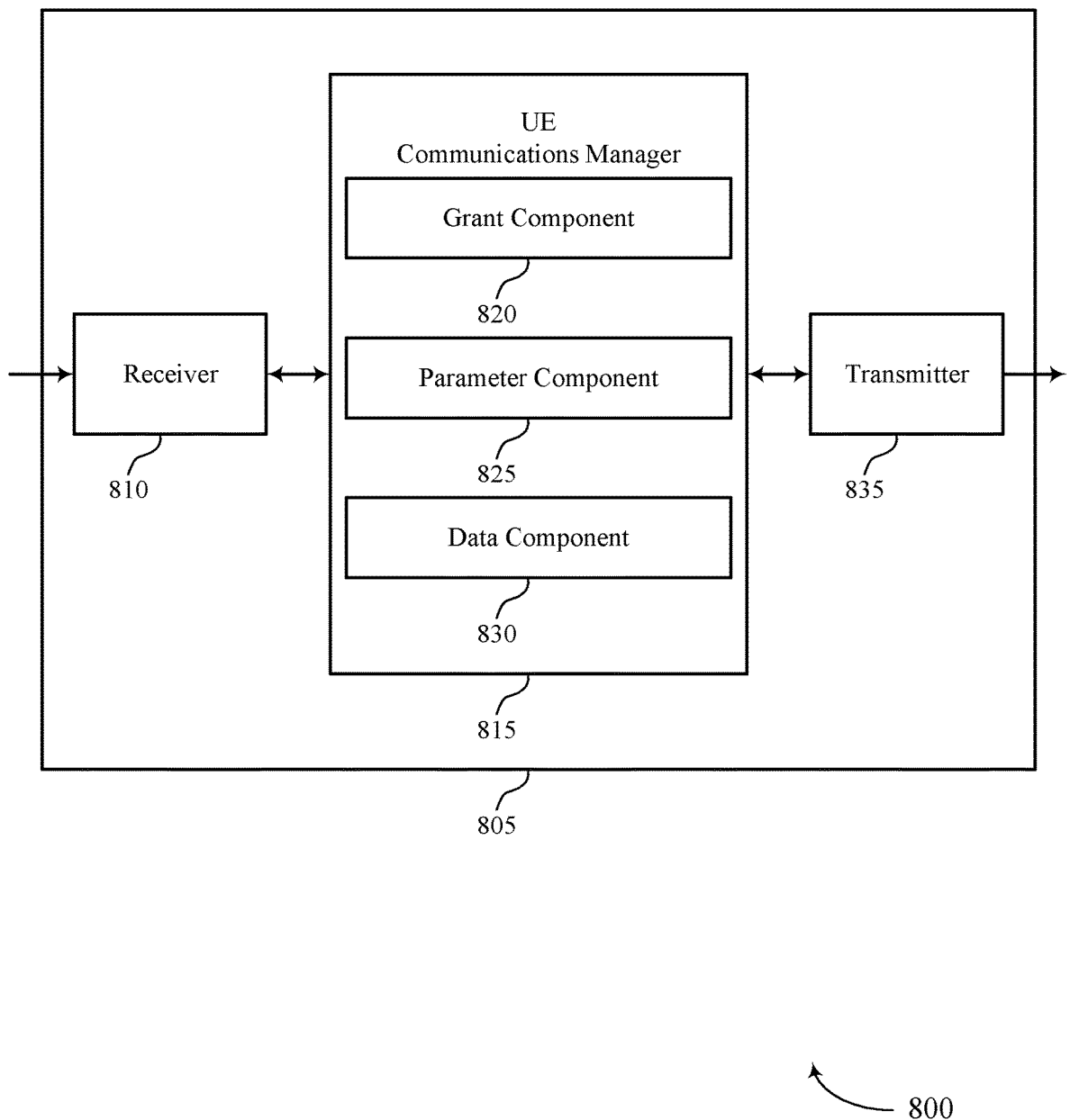

FIG. 8 shows a block diagram 800 of a device 805 that supports adaptive configured grant for power saving in accordance with aspects of the present disclosure. The device 805 may be an example of aspects of a device 705, or a UE 115 as described herein. The device 805 may include a receiver 810, a UE communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to adaptive configured grant for power saving, etc.). Information may be passed on to other components of the device 805. The receiver 810 may be an example of aspects of the transceiver 1020 described with reference to FIG. 10. The receiver 810 may utilize a single antenna or a set of antennas.

The UE communications manager 815 may be an example of aspects of the UE communications manager 715 as described herein. The UE communications manager 815 may include a grant component 820, a parameter component 825, and a data component 830. The UE communications manager 815 may be an example of aspects of the UE communications manager 1010 described herein. The grant component 820 may receive a grant configuration including multiple set of parameters, each set of parameters including one or more parameters for semi-persistent uplink data. The parameter component 825 may select a set of parameters from the multiple set of parameters based on a channel condition. The data component 830 may transmit, to a base station, the semi-persistent uplink data using the selected set of parameters.

The transmitter 835 may transmit signals generated by other components of the device 805. In some examples, the transmitter 835 may be collocated with a receiver 810 in a transceiver component. For example, the transmitter 835 may be an example of aspects of the transceiver 1020 described with reference to FIG. 10. The transmitter 835 may utilize a single antenna or a set of antennas.

Figure 9:
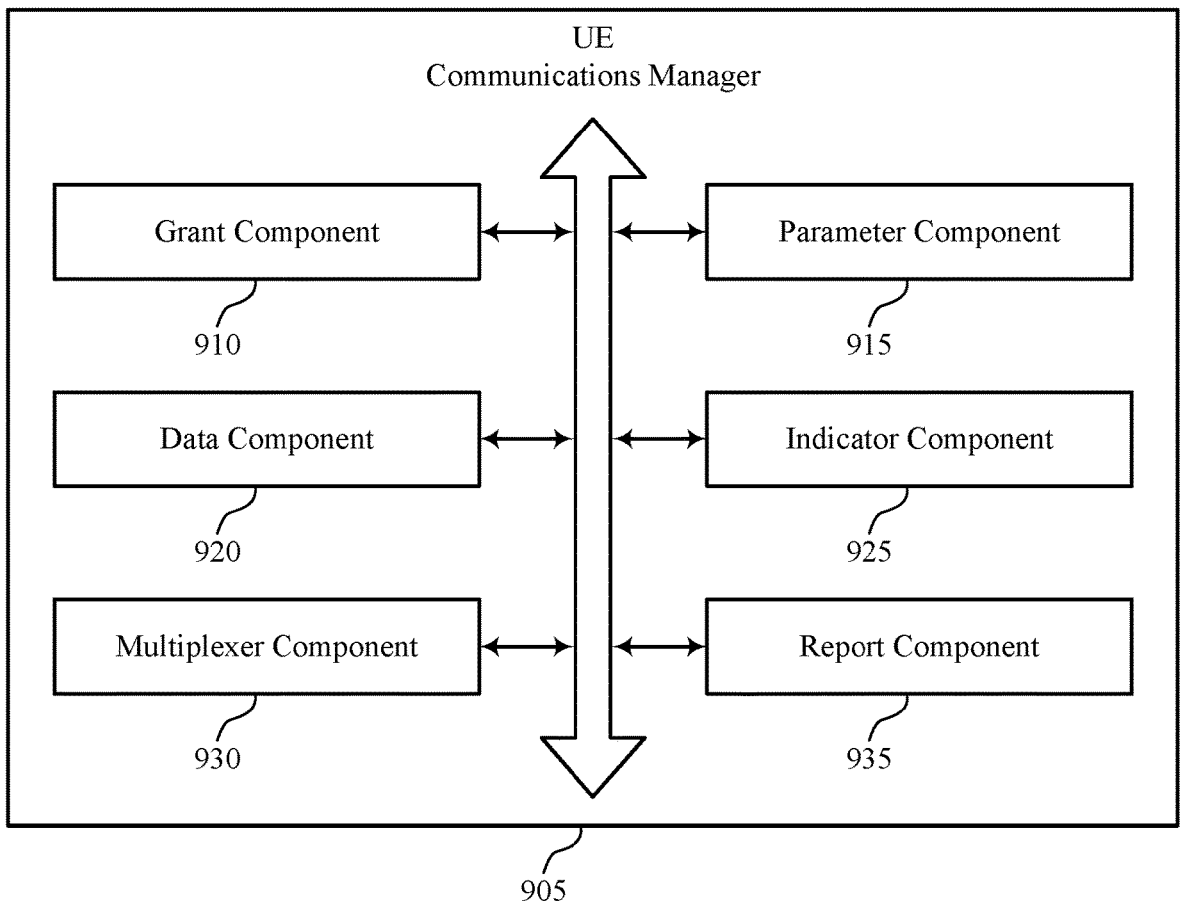
FIG. 9 shows a block diagram of a UE communications manager that supports adaptive configured grant for power saving in accordance with aspects of the present disclosure.

FIG. 9 shows a block diagram 900 of a UE communications manager 905 that supports adaptive configured grant for power saving in accordance with aspects of the present disclosure. The UE communications manager 905 may be an example of aspects of a UE communications manager 715, a UE communications manager 815, or a UE communications manager 1010 described herein. The UE communications manager 905 may include a grant component 910, a parameter component 915, a data component 920, an indicator component 925, a multiplexer component 930, and a report component 935. Each of these components may communicate, directly or indirectly, with one another (e.g., via one or more buses).

The grant component 910 may receive a grant configuration including multiple set of parameters, each set of parameters including one or more parameters for semi-persistent uplink data. The parameter component 915 may select a set of parameters from the multiple set of parameters based on a channel condition. In some cases, the one or more parameters include a repetition factor value, an MCS index value, a TBS index value, a number of layers, a number of antenna ports, a PMI value, or a combination thereof. The parameter component 915 may receive, from the base station via a downlink channel, a message including downlink parameters and uplink parameters associated with the semi-persistent uplink data for an XR application, where selecting the set of parameters associated with the grant configuration is based on the received downlink and uplink parameters. In some cases, the downlink parameters or the uplink parameters, or both, include a discontinuous reception cycle, a grant periodicity, a semi-persistent scheduling periodicity, a scheduling request periodicity, or a combination thereof.

The data component 920 may transmit, to a base station, the semi-persistent uplink data using the selected set of parameters. The indicator component 925 may transmit an indication of the one or more parameters associated with the selected set of parameters. In some examples, the indicator component 925 may transmit the indication of the one or more parameters associated with the selected set of parameters on an uplink channel using one or more uplink resources. In some examples, the indicator component 925 may transmit, in a MAC-CE message, the indication of the one or more parameters associated with the selected set of parameters via the semi-persistent uplink data. In some examples, the indicator component 925 may apply the one or more parameters associated with the selected set of parameters for a subsequent semi-persistent uplink data based on transmitting, in the MAC-CE message, the indication of the one or more parameters associated with the selected set of parameters via the semi-persistent uplink data.

The indicator component 925 may transmit, in an RRC message, the indication of the one or more parameters associated with the selected set of parameters. In some cases, the indication identifies one or more parameter values of the one or more parameters associated with the selected set of parameters for the semi-persistent uplink data. In some cases, the indication identifies the selected set of parameters for the semi-persistent uplink data. In some cases, the uplink channel includes a PUCCH. In some cases, the one or more uplink resources include one or more preconfigured PUCCH resources associated with one or more grant resources associated with the grant. In some cases, the one or more uplink resources and the one or more grant resources include a same periodicity. In some cases, the one or more uplink resources and the one or more grant resources include a different periodicity. The multiplexer component 930 may multiplex the MAC-CE message with another uplink transmission, where transmitting, in the MAC-CE message, the indication of the one or more parameters associated with the selected set of parameters via the semi-persistent uplink data is based on multiplexing the MAC-CE message with the other uplink transmission.

The report component 935 may transmit, to the base station, a report identifying a channel degradation level based on the channel condition. In some examples, the report component 935 may receive, from the base station via a downlink channel, a message to select the set of parameters associated with the grant configuration based on the transmitted report, the set of parameters including a periodicity, one or more offsets for one or more configured grants, a repetition factor value, or a number of slots allocated in a configured grant, or any combination thereof. The report component 935 may include a MAC-CE indicating one or both of an activation or a deactivation of a group of configured grants, where the MAC-CE includes a sequence of bits, where each bit corresponds to either a configured grant or a group of configured grants configured via RRC signaling. The UE may send the MAC-CE to a base station to indicate which configured grant is to be activated or not, or to which group of configured grants to switch to. In some cases, the message includes a MAC-CE message, an RRC message, or a DCI message, or a combination thereof. In some cases, the downlink channel includes a PDCCH.

Figure 10:
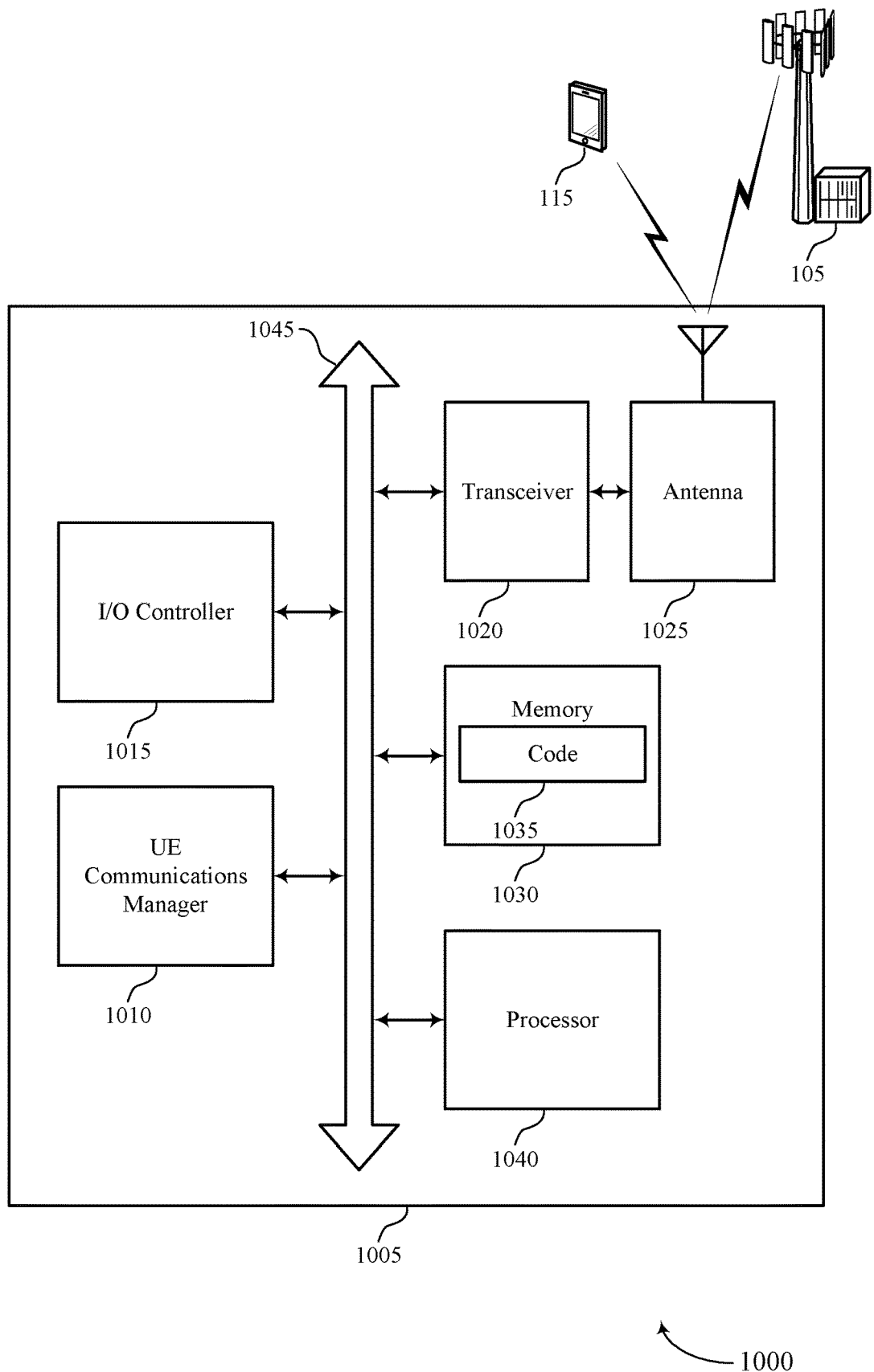
FIG. 10 shows a diagram of a system including a device that supports adaptive configured grant for power saving in accordance with aspects of the present disclosure.

FIG. 10 shows a diagram of a system 1000 including a device 1005 that supports adaptive configured grant for power saving in accordance with aspects of the present disclosure. The device 1005 may be an example of or include the components of device 705, device 805, or a UE 115 as described herein. The device 1005 may include components for bi-directional voice and data communications including components for transmitting and receiving communications, including a UE communications manager 1010, an I/O controller 1015, a transceiver 1020, an antenna 1025, memory 1030, and a processor 1040. These components may be in electronic communication via one or more buses (e.g., bus 1045).

At least one implementation may enable the UE communications manager 1010 to support configured grant that includes multiple set of parameters, and the UE communications manager 1010 may select a set of parameters from the configured grant based on a channel condition (e.g., a channel link quality measurement, a path loss measurement, a channel state information measurement). For example, the UE communications manager 1010 may receive a grant configuration including multiple set of parameters, each set of parameters including one or more parameters for semi-persistent uplink data. The UE communications manager 1010 may select a set of parameters from the multiple set of parameters based on a channel condition, and transmit, to a base station, the semi-persistent uplink data using the selected set of parameters. Based on adapting the configured grant, one or more processors of the device 1005 (for example, processor(s) controlling or incorporated with the UE communications manager 1010) may promote improvements to power consumption, and, in some examples, may promote enhanced efficiency for high reliability and low latency wireless communications operations, among other benefits.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas. In some cases, the device 1005 may include a single antenna 1025. However, in some cases, the device 1005 may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor 1040 to perform various functions described herein. In some cases, the memory 1030 may contain, among other things, a basic input/output system (BIOS) which may control basic hardware or software operation such as the interaction with peripheral components or devices. The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting adaptive configured grant for power saving).

Figure 11:
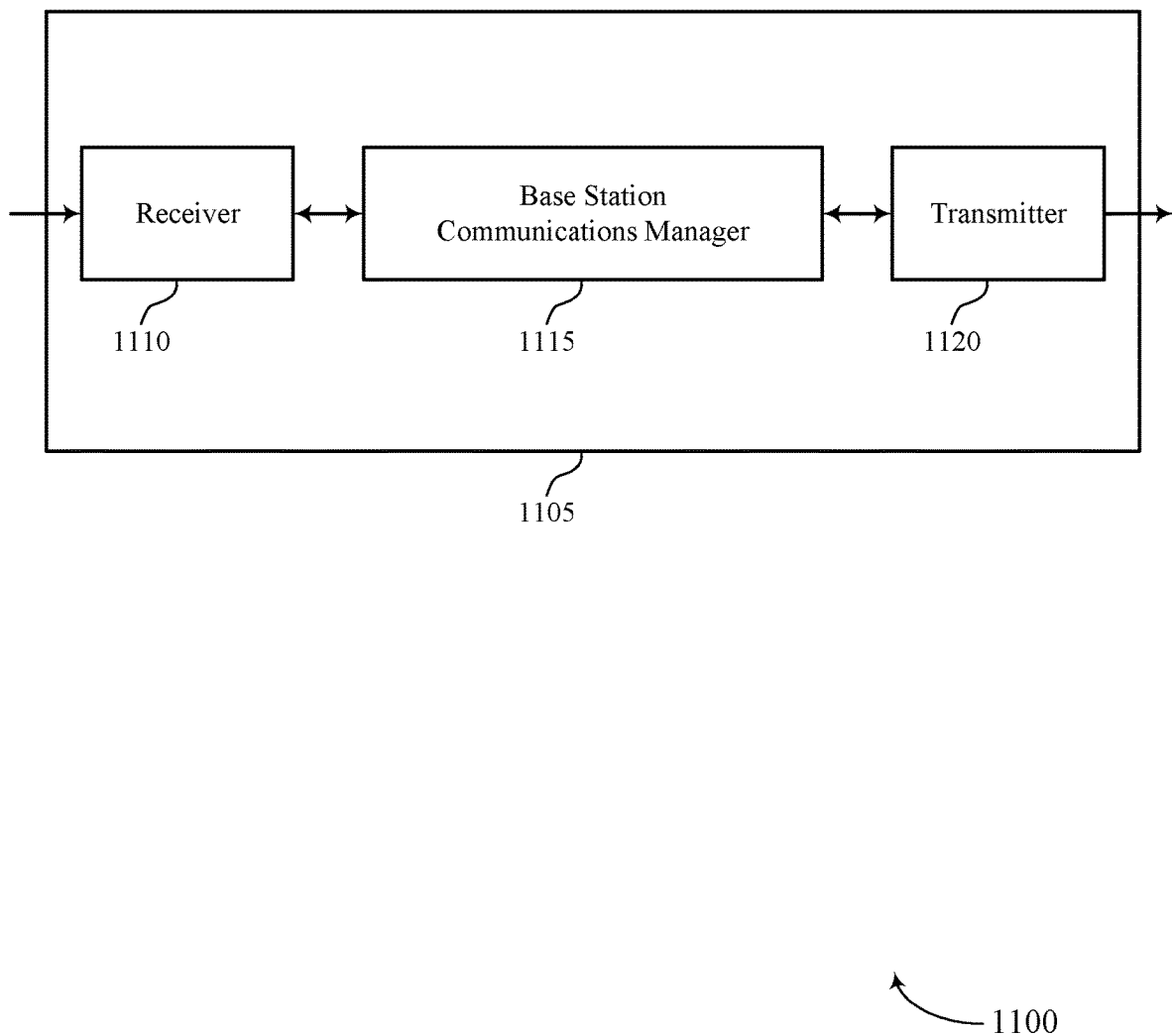
FIGS. 11 and 12 show block diagrams of devices that support adaptive configured grant for power saving in accordance with aspects of the present disclosure.

FIG. 11 shows a block diagram 1100 of a device 1105 that supports adaptive configured grant for power saving in accordance with aspects of the present disclosure. The device 1105 may be an example of aspects of a base station 105 as described herein. The device 1105 may include a receiver 1110, a base station communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to adaptive configured grant for power saving, etc.). Information may be passed on to other components of the device 1105. The receiver 1110 may be an example of aspects of the transceiver 1420 described with reference to FIG. 14. The receiver 1110 may utilize a single antenna or a set of antennas.

The base station communications manager 1115 may transmit, to a UE, a grant configuration including multiple set of parameters, each set of parameters including one or more parameters for semi-persistent uplink data and receive the semi-persistent uplink data from the UE, the semi-persistent uplink data associated with a set of parameters selected from the multiple set of parameters by the UE or the device 1105. The base station communications manager 1115 may be an example of aspects of the base station communications manager 1410 described herein.

The base station communications manager 1115, or its sub-components, may be implemented in hardware, code (e.g., software or firmware) executed by a processor, or any combination thereof. If implemented in code executed by a processor, the functions of the base station communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1115, or its sub-components, may be physically located at various positions, including being distributed such that portions of functions are implemented at different physical locations by one or more physical components. In some examples, the base station communications manager 1115, or its sub-components, may be a separate and distinct component in accordance with various aspects of the present disclosure. In some examples, the base station communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver component. For example, the transmitter 1120 may be an example of aspects of the transceiver 1420 described with reference to FIG. 14. The transmitter 1120 may utilize a single antenna or a set of antennas.

Figure 12:
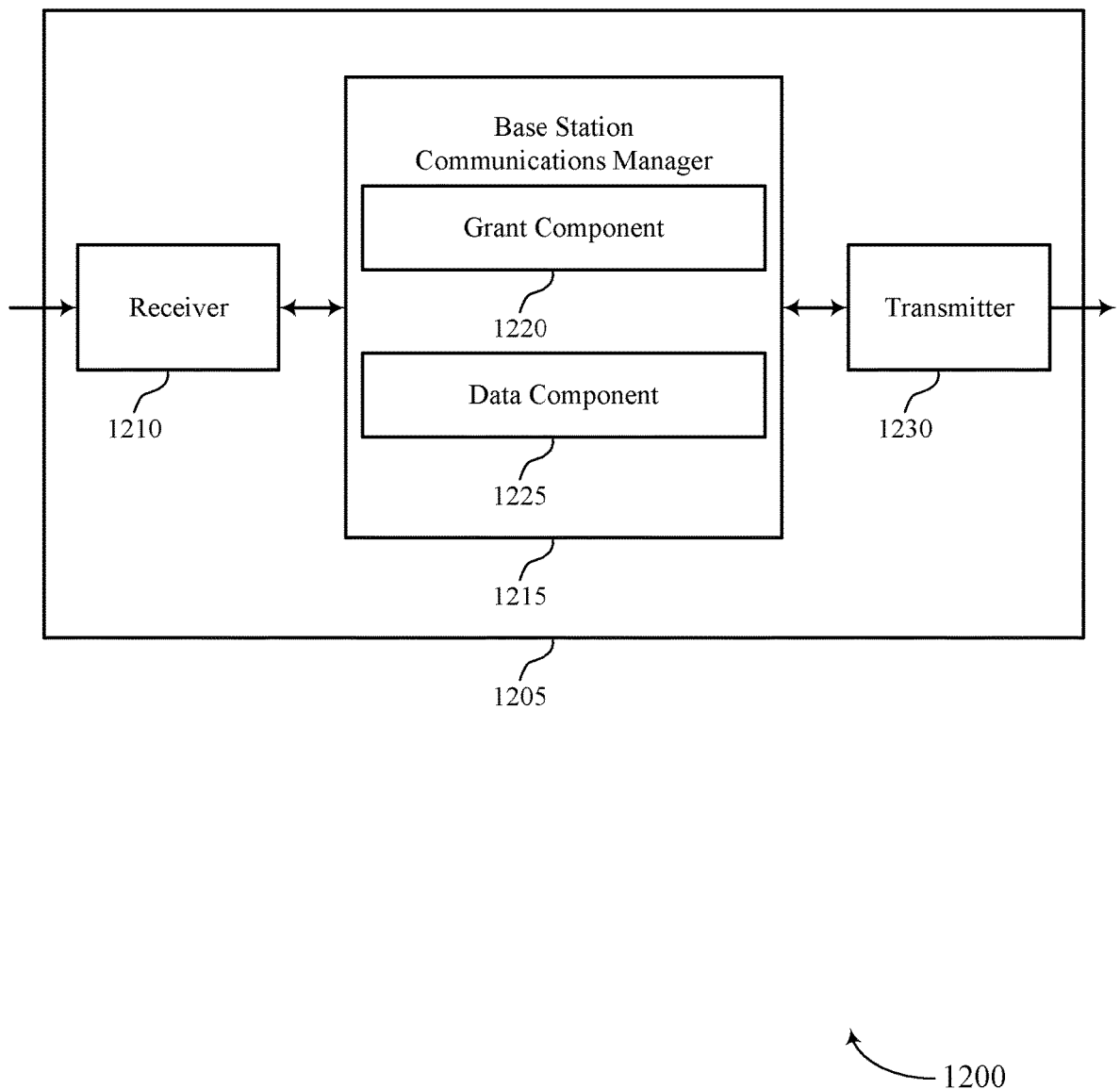

FIG. 12 shows a block diagram 1200 of a device 1205 that supports adaptive configured grant for power saving in accordance with aspects of the present disclosure. The device 1205 may be an example of aspects of a device 1105, or a base station 105 as described herein. The device 1205 may include a receiver 1210, a base station communications manager 1215, and a transmitter 1230. The device 1205 may also include a processor. Each of these components may be in communication with one another (e.g., via one or more buses).

The receiver 1210 may receive information such as packets, user data, or control information associated with various information channels (e.g., control channels, data channels, and information related to adaptive configured grant for power saving, etc.). Information may be passed on to other components of the device 1205. The receiver 1210 may be an example of aspects of the transceiver 1420 described with reference to FIG. 14. The receiver 1210 may utilize a single antenna or a set of antennas.

The base station communications manager 1215 may be an example of aspects of the base station communications manager 1115 as described herein. The base station communications manager 1215 may include a grant component 1220 and a data component 1225. The base station communications manager 1215 may be an example of aspects of the base station communications manager 1410 described herein. The grant component 1220 may transmit, to a UE, a grant configuration including multiple set of parameters, each set of parameters including one or more parameters for semi-persistent uplink data. The data component 1225 may receive the semi-persistent uplink data from the UE, the semi-persistent uplink data associated with a set of parameters selected from the multiple set of parameters by the UE or the device 1205.

The transmitter 1230 may transmit signals generated by other components of the device 1205. In some examples, the transmitter 1230 may be collocated with a receiver 1210 in a transceiver component. For example, the transmitter 1230 may be an example of aspects of the transceiver 1420 described with reference to FIG. 14. The transmitter 1230 may utilize a single antenna or a set of antennas.

Figure 13:
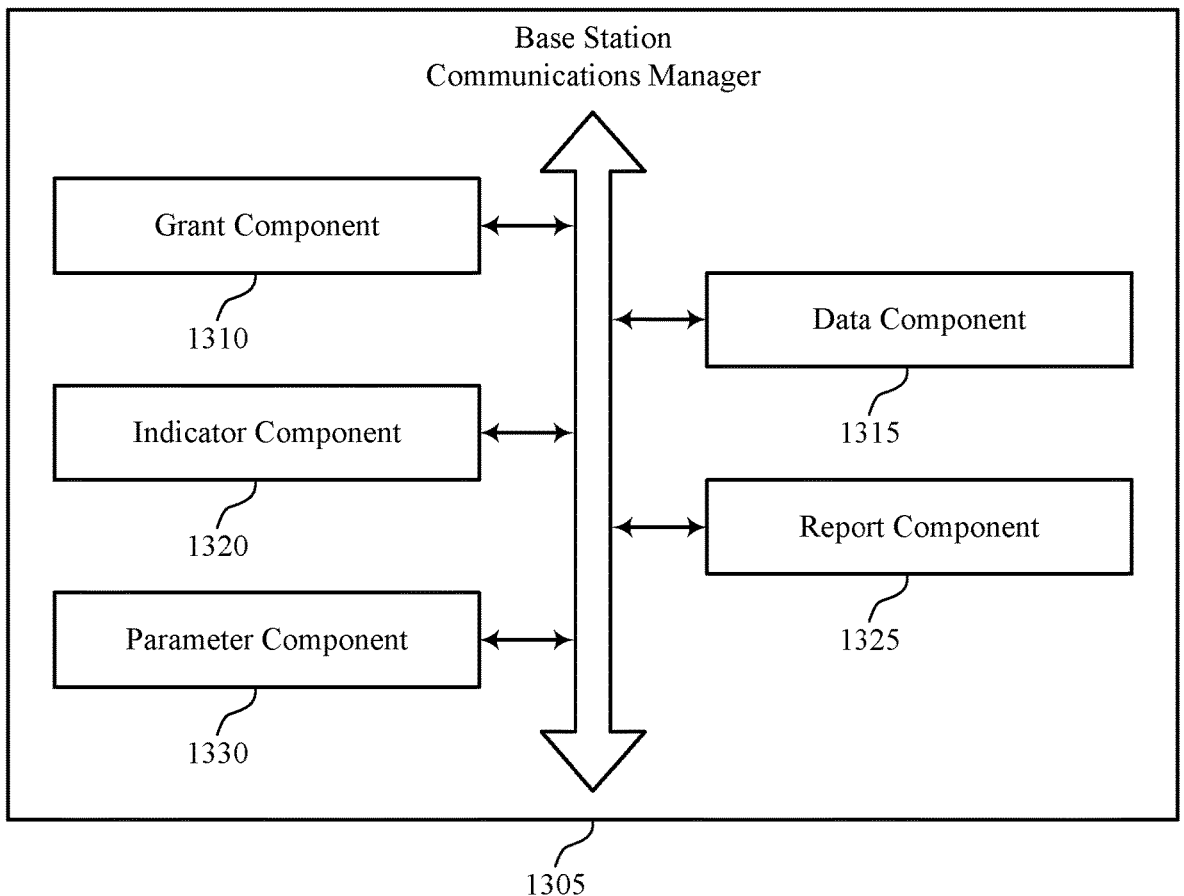
FIG. 13 shows a block diagram of a base station communications manager that supports adaptive configured grant for power saving in accordance with aspects of the present disclosure.

FIG. 13 shows a block diagram 1300 of a base station communications manager 1305 that supports adaptive configured grant for power saving in accordance with aspects of the present disclosure. The base station communications manager 1305 may be an example of aspects of a base station communications manager 1115, a base station communications manager 1215, or a base station communications manager 1410 described herein. The base station communications manager 1305 may include a grant component 1310, a data component 1315, an indicator component 1320, a report component 1325, and a parameter component 1330. Each of these components may communicate, directly or indirectly, with one another (e.g., via one or more buses).

The grant component 1310 may transmit, to a UE, a grant configuration including multiple set of parameters, each set of parameters including one or more parameters for semi-persistent uplink data. The data component 1315 may receive the semi-persistent uplink data from the UE, the semi-persistent uplink data associated with a set of parameters selected from the multiple set of parameters by the UE or the base station. The indicator component 1320 may receive an indication of the one or more parameters associated with the selected set of parameters. In some examples, the indicator component 1320 may receive, in a MAC-CE message, the indication of the one or more parameters associated with the selected set of parameters via the semi-persistent uplink data. In some examples, the indicator component 1320 may receive, in an RRC message, the indication of the one or more parameters associated with the selected set of parameters. In some cases, the indication identifies one or more parameter values of the one or more parameters associated with the selected set of parameters for the semi-persistent uplink data. In some cases, the indication identifies the selected set of parameters for the semi-persistent uplink data. The one or more parameters include a repetition factor value, an MCS index value, a TBS index value, a number of layers, a number of antenna ports, a PMI value, or a combination thereof.

The report component 1325 may receive, from the UE, a report identifying a channel degradation level based on the channel condition. The parameter component 1330 may transmit, to the UE via a downlink channel, a message to select the set of parameters associated with the grant configuration based on the received report, the set of parameters including a periodicity, one or more offsets for one or more configured grants, a repetition factor value, or a number of slots allocated in a configured grant periodicity, or any combination thereof. In some examples, the parameter component 1330 may transmit, to the UE via a downlink channel, a message including downlink parameters and uplink parameters associated with the semi-persistent uplink data for an XR application, where selecting the set of parameters associated with the grant configuration is based on the received downlink and uplink parameters. In some cases, the message includes a MAC-CE message, an RRC message, or a DCI message, or a combination thereof. In some cases, the downlink channel includes a PDCCH. In some cases, the downlink parameters or the uplink parameters, or both, include a discontinuous reception cycle, a grant periodicity, a semi-persistent scheduling periodicity, a scheduling request periodicity, or a combination thereof.

Figure 14:
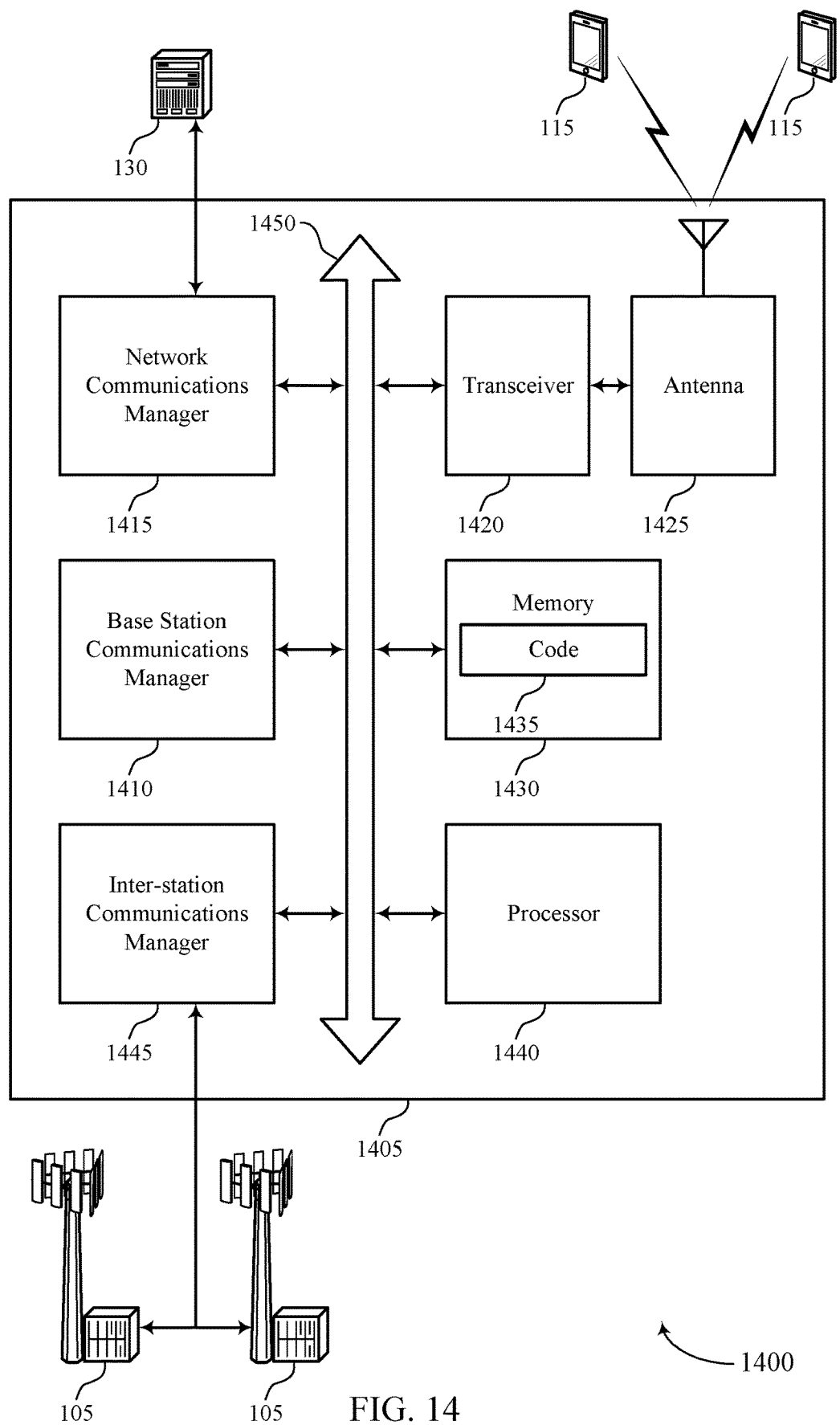
FIG. 14 shows a diagram of a system including a device that supports adaptive configured grant for power saving in accordance with aspects of the present disclosure.

FIG. 14 shows a diagram of a system 1400 including a device 1405 that supports adaptive configured grant for power saving in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a base station communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The base station communications manager 1410 may transmit, to a UE, a grant configuration including multiple set of parameters. Each set of parameters may include one or more parameters for semi-persistent uplink data. The base station communications manager 1410 may receive the semi-persistent uplink data from the UE. The semi-persistent uplink data may be associated with a set of parameters selected from the multiple set of parameters by the UE or the device 1405.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas. In some cases, the device 1405 may include a single antenna 1425. However, in some cases, the device 1405 may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices. The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting adaptive configured grant for power saving).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

Figure 15:
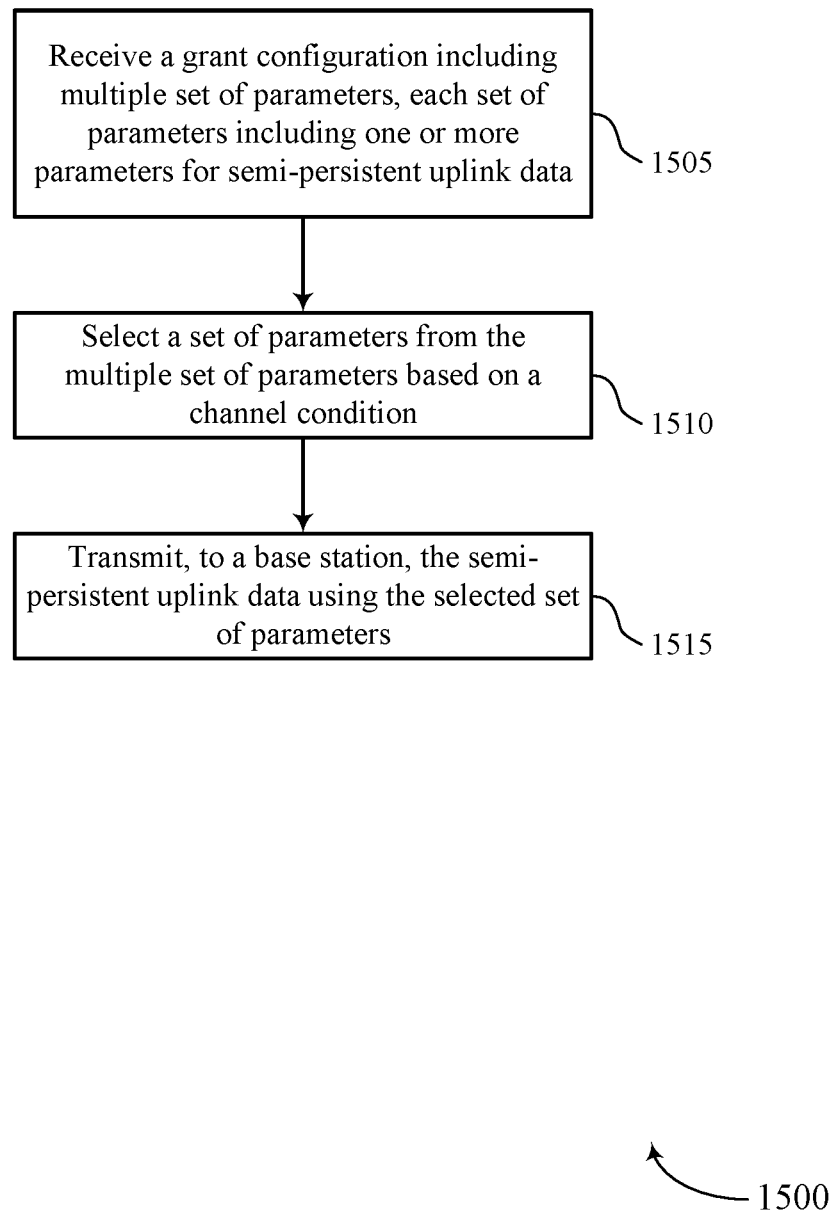
FIGS. 15 through 20 show flowcharts illustrating methods that support adaptive configured grant for power saving in accordance with aspects of the present disclosure.

FIG. 15 shows a flowchart illustrating a method 1500 that supports adaptive configured grant for power saving in accordance with aspects of the present disclosure. The operations of method 1500 may be implemented by a UE or its components as described herein. For example, the operations of method 1500 may be performed by a UE communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive a grant configuration including multiple set of parameters, each set of parameters including one or more parameters for semi-persistent uplink data. The operations of 1505 may be performed according to the methods described herein. In some examples, aspects of the operations of 1505 may be performed by a grant component as described with reference to FIGS. 7 through 10.

At 1510, the UE may select a set of parameters from the multiple set of parameters based on a channel condition. The operations of 1510 may be performed according to the methods described herein. In some examples, aspects of the operations of 1510 may be performed by a parameter component as described with reference to FIGS. 7 through 10.

At 1515, the UE may transmit, to a base station, the semi-persistent uplink data using the selected set of parameters. The operations of 1515 may be performed according to the methods described herein. In some examples, aspects of the operations of 1515 may be performed by a data component as described with reference to FIGS. 7 through 10.

Figure 16:
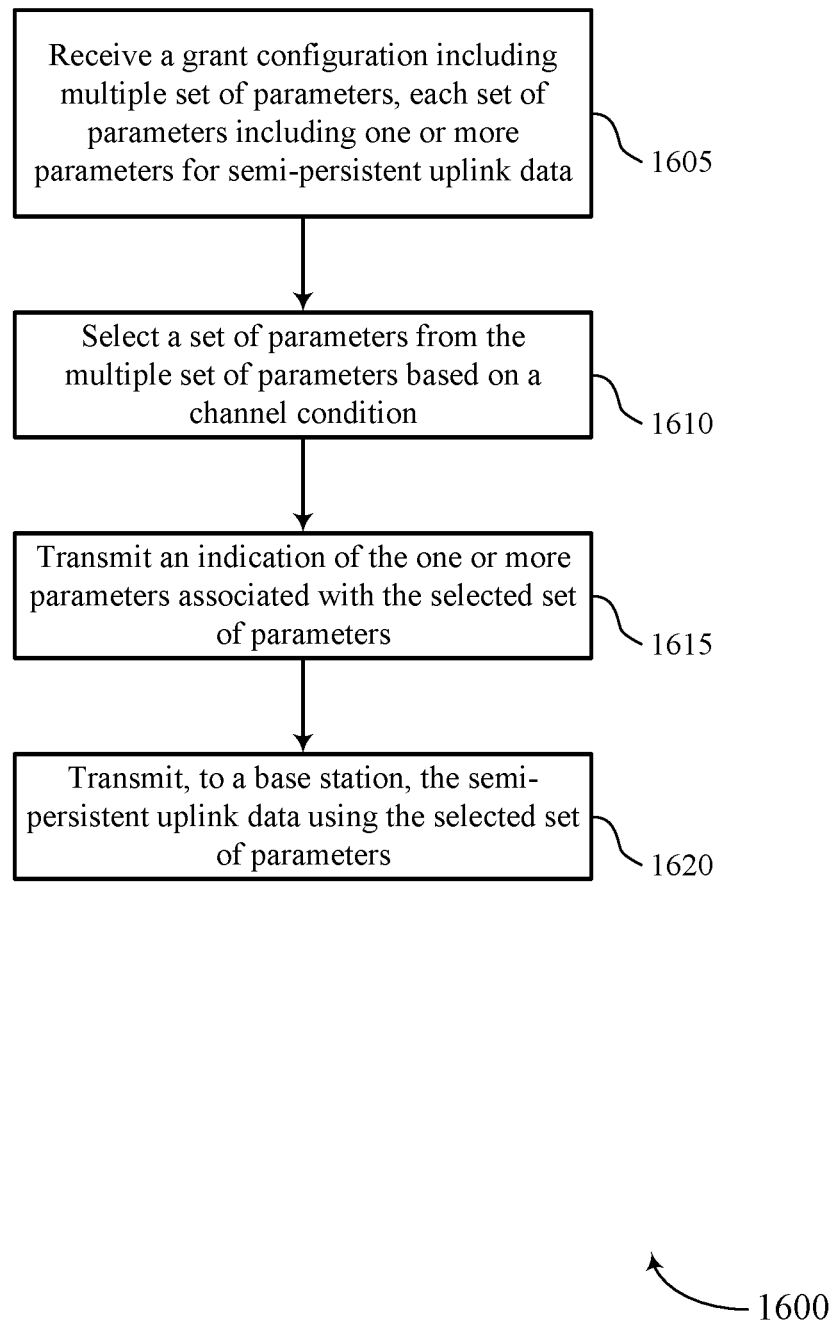

FIG. 16 shows a flowchart illustrating a method 1600 that supports adaptive configured grant for power saving in accordance with aspects of the present disclosure. The operations of method 1600 may be implemented by a UE or its components as described herein. For example, the operations of method 1600 may be performed by a UE communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive a grant configuration including multiple set of parameters, each set of parameters including one or more parameters for semi-persistent uplink data. The operations of 1605 may be performed according to the methods described herein. In some examples, aspects of the operations of 1605 may be performed by a grant component as described with reference to FIGS. 7 through 10.

At 1610, the UE may select a set of parameters from the multiple set of parameters based on a channel condition. The operations of 1610 may be performed according to the methods described herein. In some examples, aspects of the operations of 1610 may be performed by a parameter component as described with reference to FIGS. 7 through 10.

At 1615, the UE may transmit an indication of the one or more parameters associated with the selected set of parameters. The operations of 1615 may be performed according to the methods described herein. In some examples, aspects of the operations of 1615 may be performed by an indicator component as described with reference to FIGS. 7 through 10.

At 1620, the UE may transmit, to a base station, the semi-persistent uplink data using the selected set of parameters. The operations of 1620 may be performed according to the methods described herein. In some examples, aspects of the operations of 1620 may be performed by a data component as described with reference to FIGS. 7 through 10.

Figure 17:
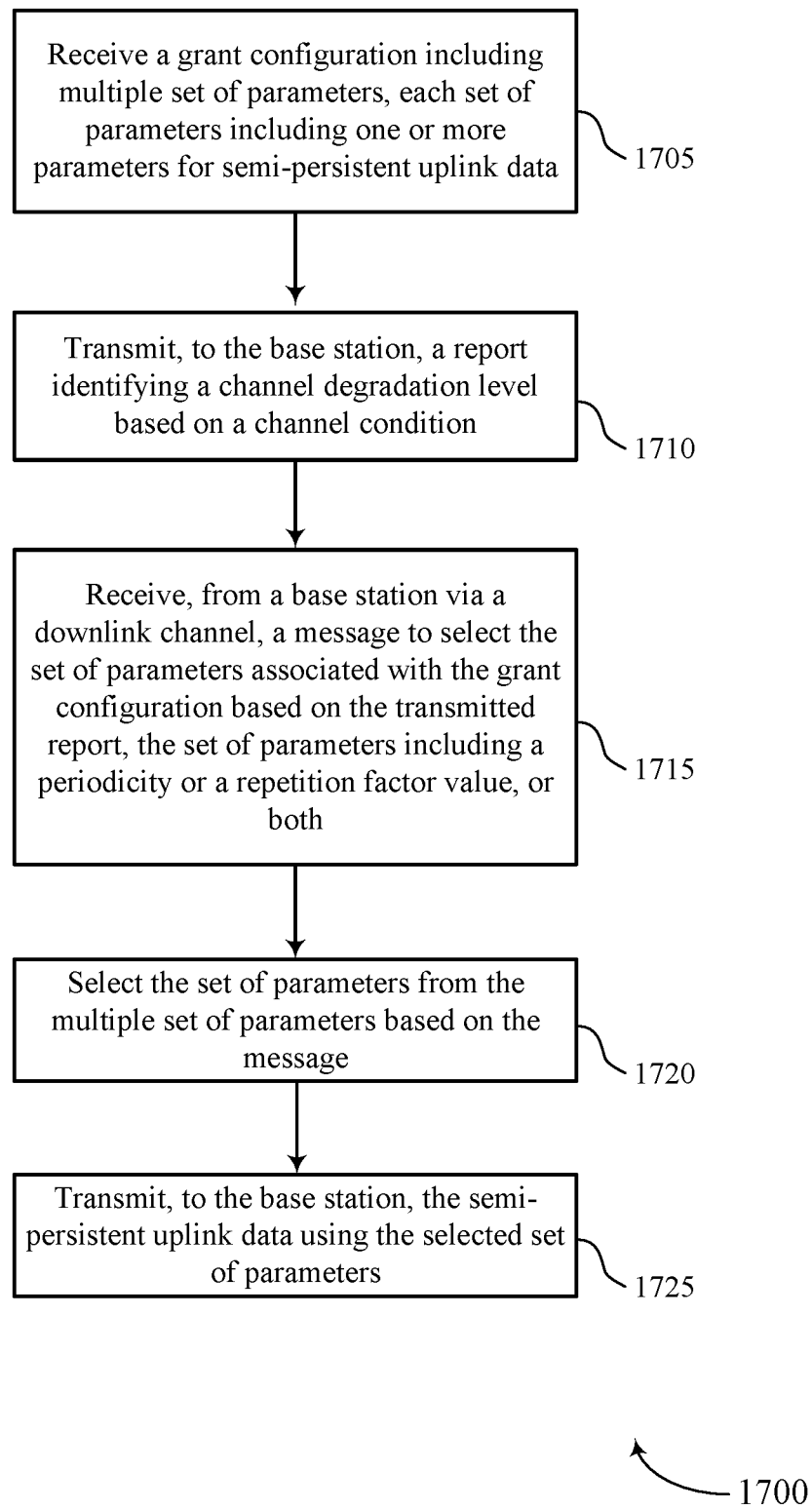

FIG. 17 shows a flowchart illustrating a method 1700 that supports adaptive configured grant for power saving in accordance with aspects of the present disclosure. The operations of method 1700 may be implemented by a UE or its components as described herein. For example, the operations of method 1700 may be performed by a UE communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may receive a grant configuration including multiple set of parameters, each set of parameters including one or more parameters for semi-persistent uplink data. The operations of 1705 may be performed according to the methods described herein. In some examples, aspects of the operations of 1705 may be performed by a grant component as described with reference to FIGS. 7 through 10.

At 1710, the UE may transmit, to the base station, a report identifying a channel degradation level based on a channel condition. The operations of 1710 may be performed according to the methods described herein. In some examples, aspects of the operations of 1710 may be performed by a report component as described with reference to FIGS. 7 through 10.

At 1715, the UE may receive, from a base station via a downlink channel, a message to select the set of parameters associated with the grant configuration based on the transmitted report, the set of parameters including a periodicity or a repetition factor value, or both. The operations of 1715 may be performed according to the methods described herein. In some examples, aspects of the operations of 1715 may be performed by a report component as described with reference to FIGS. 7 through 10.

At 1720, the UE may select the set of parameters from the multiple set of parameters based on the message. The operations of 1720 may be performed according to the methods described herein. In some examples, aspects of the operations of 1720 may be performed by a parameter component as described with reference to FIGS. 7 through 10.

At 1725, the UE may transmit, to the base station, the semi-persistent uplink data using the selected set of parameters. The operations of 1725 may be performed according to the methods described herein. In some examples, aspects of the operations of 1725 may be performed by a data component as described with reference to FIGS. 7 through 10.

Figure 18:
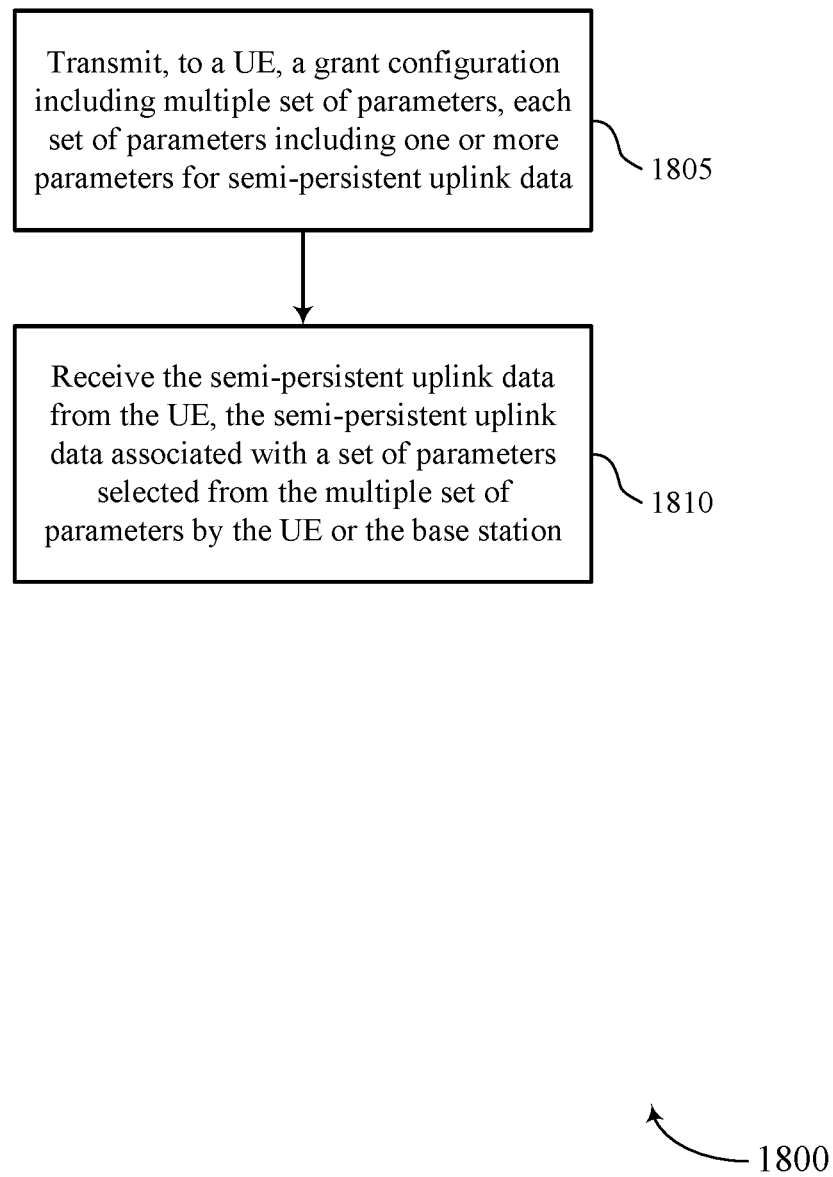

FIG. 18 shows a flowchart illustrating a method 1800 that supports adaptive configured grant for power saving in accordance with aspects of the present disclosure. The operations of method 1800 may be implemented by a base station or its components as described herein. For example, the operations of method 1800 may be performed by a base station communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may transmit, to a UE, a grant configuration including multiple set of parameters, each set of parameters including one or more parameters for semi-persistent uplink data. The operations of 1805 may be performed according to the methods described herein. In some examples, aspects of the operations of 1805 may be performed by a grant component as described with reference to FIGS. 11 through 14.

At 1810, the base station may receive the semi-persistent uplink data from the UE, the semi-persistent uplink data associated with a set of parameters selected from the multiple set of parameters by the UE or the base station. The operations of 1810 may be performed according to the methods described herein. In some examples, aspects of the operations of 1810 may be performed by a data component as described with reference to FIGS. 11 through 14.

Figure 19:
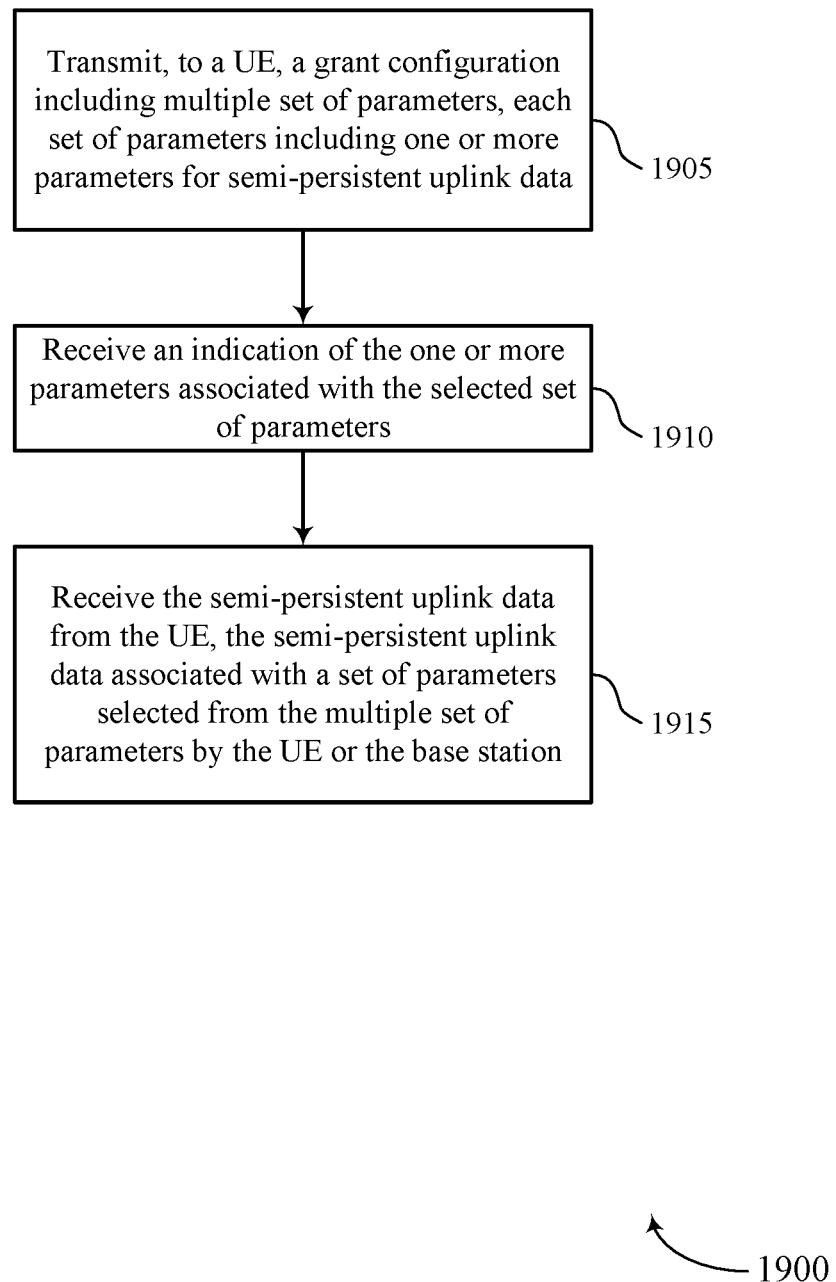

FIG. 19 shows a flowchart illustrating a method 1900 that supports adaptive configured grant for power saving in accordance with aspects of the present disclosure. The operations of method 1900 may be implemented by a base station or its components as described herein. For example, the operations of method 1900 may be performed by a base station communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1905, the base station may transmit, to a UE, a grant configuration including multiple set of parameters, each set of parameters including one or more parameters for semi-persistent uplink data. The operations of 1905 may be performed according to the methods described herein. In some examples, aspects of the operations of 1905 may be performed by a grant component as described with reference to FIGS. 11 through 14.

At 1910, the base station may receive an indication of the one or more parameters associated with the selected set of parameters. The operations of 1910 may be performed according to the methods described herein. In some examples, aspects of the operations of 1910 may be performed by an indicator component as described with reference to FIGS. 11 through 14.

At 1915, the base station may receive the semi-persistent uplink data from the UE, the semi-persistent uplink data associated with a set of parameters selected from the multiple set of parameters by the UE or the base station. The operations of 1915 may be performed according to the methods described herein. In some examples, aspects of the operations of 1915 may be performed by a data component as described with reference to FIGS. 11 through 14.

Figure 20:
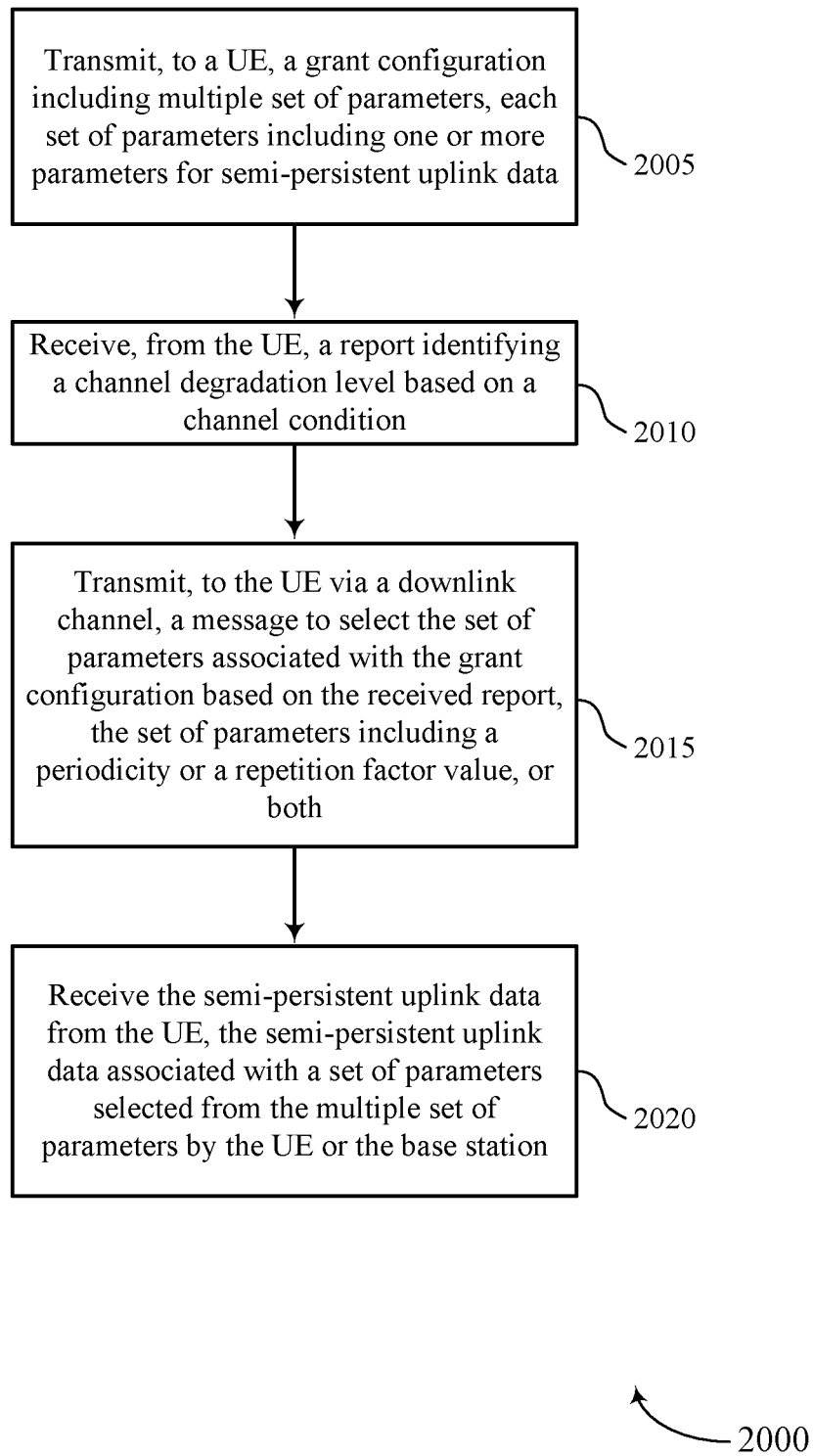

FIG. 20 shows a flowchart illustrating a method 2000 that supports adaptive configured grant for power saving in accordance with aspects of the present disclosure. The operations of method 2000 may be implemented by a base station or its components as described herein. For example, the operations of method 2000 may be performed by a base station communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2005, the base station may transmit, to a UE, a grant configuration including multiple set of parameters, each set of parameters including one or more parameters for semi-persistent uplink data. The operations of 2005 may be performed according to the methods described herein. In some examples, aspects of the operations of 2005 may be performed by a grant component as described with reference to FIGS. 11 through 14.

At 2010, the base station may receive, from the UE, a report identifying a channel degradation level based on a channel condition. The operations of 2010 may be performed according to the methods described herein. In some examples, aspects of the operations of 2010 may be performed by a report component as described with reference to FIGS. 11 through 14.

At 2015, the base station may transmit, to the UE via a downlink channel, a message to select the set of parameters associated with the grant configuration based on the received report, the set of parameters including a periodicity or a repetition factor value, or both. The operations of 2015 may be performed according to the methods described herein. In some examples, aspects of the operations of 2015 may be performed by a parameter component as described with reference to FIGS. 11 through 14.

At 2020, the base station may receive the semi-persistent uplink data from the UE, the semi-persistent uplink data associated with a set of parameters selected from the multiple set of parameters by the UE or the base station. The operations of 2020 may be performed according to the methods described herein. In some examples, aspects of the operations of 2020 may be performed by a data component as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving a grant configuration comprising multiple set of parameters, each set of parameters comprising one or more parameters for semi-persistent uplink data; selecting a set of parameters from the multiple set of parameters based at least in part on a channel condition; and transmitting, to a base station, the semi-persistent uplink data using the selected set of parameters.

Aspect 2: The method of aspect 1, further comprising: transmitting an indication of the one or more parameters associated with the selected set of parameters.

Aspect 3: The method of aspect 2, wherein the indication identifies one or more parameter values of the one or more parameters associated with the selected set of parameters for the semi-persistent uplink data.

Aspect 4: The method of any of aspects 2 through 3, wherein the indication identifies the selected set of parameters for the semi-persistent uplink data.

Aspect 5: The method of any of aspects 2 through 4, wherein the one or more parameters comprise a repetition factor value, an MCS index value, a TBS index value, a number of layers, a number of antenna ports, a PMI value, or a combination thereof.

Aspect 6: The method of any of aspects 2 through 5, wherein transmitting the indication comprises: transmitting the indication of the one or more parameters associated with the selected set of parameters on an uplink channel using one or more uplink resources.

Aspect 7: The method of aspect 6, wherein the uplink channel comprises a PUCCH.

Aspect 8: The method of any of aspects 6 through 7, wherein the one or more uplink resources comprise one or more preconfigured PUCCH resources associated with one or more grant resources associated with the grant.

Aspect 9: The method of aspect 8, wherein the one or more uplink resources and the one or more grant resources comprise a same periodicity.

Aspect 10: The method of any of aspects 8 through 9, wherein the one or more uplink resources and the one or more grant resources comprise a different periodicity.

Aspect 11: The method of any of aspects 2 through 10, wherein transmitting the indication comprises: transmitting, in a MAC-CE message, the indication of the one or more parameters associated with the selected set of parameters via the semi-persistent uplink data; and applying the one or more parameters associated with the selected set of parameters for a subsequent semi-persistent uplink data based at least in part on transmitting, in the MAC-CE message, the indication of the one or more parameters associated with the selected set of parameters via the semi-persistent uplink data.

Aspect 12: The method of aspect 11, further comprising: multiplexing the MAC-CE message with another uplink transmission, wherein transmitting, in the MAC-CE message, the indication of the one or more parameters associated with the selected set of parameters via the semi-persistent uplink data is based at least in part on multiplexing the MAC-CE message with the other uplink transmission.

Aspect 13: The method of any of aspects 2 through 12, wherein transmitting the indication comprises: transmitting, in an RRC message, the indication of the one or more parameters associated with the selected set of parameters.

Aspect 14: The method of any of aspects 1 through 13, further comprising: transmitting, to the base station, a report identifying a channel degradation level based at least in part on the channel condition; and receiving, from the base station via a downlink channel, a message to select the set of parameters associated with the grant configuration based at least in part on the transmitted report, the set of parameters comprising a periodicity or a repetition factor value, or both.

Aspect 15: The method of aspect 14, wherein the message comprises a MAC-CE message, an RRC message, or a DCI message, or a combination thereof.

Aspect 16: The method of any of aspects 14 through 15, wherein the downlink channel comprises a PDCCH.

Aspect 17: The method of any of aspects 1 through 16, further comprising: receiving, from the base station via a downlink channel, a message comprising downlink parameters and uplink parameters associated with the semi-persistent uplink data for an XR application, wherein selecting the set of parameters associated with the grant configuration is based at least in part on the received downlink and uplink parameters.

Aspect 18: The method of aspect 17, wherein the downlink parameters or the uplink parameters, or both, comprise a discontinuous reception cycle, a grant periodicity, a semi-persistent scheduling periodicity, a scheduling request periodicity, or a combination thereof.

Aspect 19: A method for wireless communication at a base station, comprising: transmitting, to a UE, a grant configuration comprising multiple set of parameters, each set of parameters comprising one or more parameters for semi-persistent uplink data; and receiving the semi-persistent uplink data from the UE, the semi-persistent uplink data associated with a set of parameters selected from the multiple set of parameters by the UE or the base station.

Aspect 20: The method of aspect 19, further comprising: receiving an indication of the one or more parameters associated with the selected set of parameters.

Aspect 21: The method of aspect 20, wherein the indication identifies one or more parameter values of the one or more parameters associated with the selected set of parameters for the semi-persistent uplink data.

Aspect 22: The method of any of aspects 20 through 21, wherein the indication identifies the selected set of parameters for the semi-persistent uplink data.

Aspect 23: The method of any of aspects 20 through 22, wherein the one or more parameters comprise a repetition factor value, an MCS index value, a TBS index value, a number of layers, a number of antenna ports, a PMI value, or a combination thereof.

Aspect 24: The method of any of aspects 20 through 23, wherein receiving the indication comprises: receiving, in a MAC-CE message, the indication of the one or more parameters associated with the selected set of parameters via the semi-persistent uplink data.

Aspect 25: The method of any of aspects 20 through 24, wherein receiving the indication comprises: receiving, in an RRC message, the indication of the one or more parameters associated with the selected set of parameters.

Aspect 26: The method of any of aspects 19 through 25, further comprising: receiving, from the UE, a report identifying a channel degradation level based at least in part on a channel condition; and transmitting, to the UE via a downlink channel, a message to select the set of parameters associated with the grant configuration based at least in part on the received report, the set of parameters comprising a periodicity or a repetition factor value, or both.

Aspect 27: The method of aspect 26, wherein the message comprises a MAC-CE message, an RRC message, or a DCI message, or a combination thereof.

Aspect 28: The method of any of aspects 26 through 27, wherein the downlink channel comprises a PDCCH.

Aspect 29: The method of any of aspects 19 through 28, further comprising: transmitting, to the UE via a downlink channel, a message comprising downlink parameters and uplink parameters associated with the semi-persistent uplink data for an XR application, wherein selecting the set of parameters associated with the grant configuration is based at least in part on the received downlink and uplink parameters.

Aspect 30: The method of aspect 29, wherein the downlink parameters or the uplink parameters, or both, comprise a discontinuous reception cycle, a grant periodicity, a semi-persistent scheduling periodicity, a scheduling request periodicity, or a combination thereof.

Aspect 31: An apparatus for wireless communication, comprising a processor; memory coupled with the processor; and instructions stored in the memory and executable by the processor to cause the apparatus to perform a method of any of aspects 1 through 18.

Aspect 32: An apparatus for wireless communication, comprising at least one means for performing a method of any of aspects 1 through 18.

Aspect 33: A non-transitory computer-readable medium storing code for wireless communication at a UE, the code comprising instructions executable by a processor to perform a method of any of aspects 1 through 18.

Aspect 34: An apparatus for wireless communication, comprising a processor; memory coupled with the processor; and instructions stored in the memory and executable by the processor to cause the apparatus to perform a method of any of aspects 19 through 30.

Aspect 35: An apparatus for wireless communication, comprising at least one means for performing a method of any of aspects 19 through 30.

Aspect 36: A non-transitory computer-readable medium storing code for wireless communication at a base station, the code comprising instructions executable by a processor to perform a method of any of aspects 19 through 30.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving a configuration comprising multiple sets of parameters for a configured grant transmission of semi-persistent uplink data;
    selecting a set of one or more parameters from the multiple sets of parameters for the configured grant transmission of the semi-persistent uplink data based at least in part on a channel condition;
    transmitting, to a base station, the configured grant transmission of the semi-persistent uplink data using the selected set of one or more parameters;
    wherein transmitting the indication comprises:
    transmitting, in a medium access control-control element message, the indication of the one or more parameters associated with the selected set of one or more parameters from the multiple sets of parameters for the configured grant transmission of the semi-persistent uplink data; and
    applying the one or more parameters associated with the selected set of one or more parameters for a subsequent configured grant transmission of subsequent semi-persistent uplink data based at least in part on transmitting, in the medium access control-control element message, the indication of the one or more parameters associated with the selected set of one or more parameters from the multiple sets of parameters for the configured grant transmission of the semi-persistent uplink data.

2. The method of claim 1, further comprising:
    transmitting an indication of one or more parameters associated with the selected set of one or more parameters from the multiple sets of parameters for the configured grant transmission of the semi-persistent uplink data.

3. The method of claim 2, wherein the indication identifies one or more parameter values of the one or more parameters associated with the selected set of one or more parameters from the multiple sets of parameters for the configured grant transmission of the semi-persistent uplink data.

4. The method of claim 2, wherein the indication identifies the selected set of one or more parameters from the multiple sets of parameters for the configured grant transmission of the semi-persistent uplink data.

5. The method of claim 2, wherein the one or more parameters comprise a repetition factor value, a modulation and coding scheme index value, a transport block size index value, a number of layers, a number of antenna ports, a precoding matrix index value, or a combination thereof.

6. The method of claim 2, wherein transmitting the indication comprises:
    transmitting the indication of the one or more parameters associated with the selected set of one or more parameters from the multiple sets of parameters for the configured grant transmission of on an uplink channel using one or more uplink resources.

7. The method of claim 6, wherein the one or more uplink resources comprise one or more preconfigured physical uplink control channel resources associated with one or more grant resources.

8. The method of claim 7, wherein the one or more uplink resources and the one or more grant resources comprise a same periodicity.

9. The method of claim 7, wherein the one or more uplink resources and the one or more grant resources comprise a different periodicity.

10. The method of claim 1, further comprising:
multiplexing the medium access control-control element message with an uplink transmission, wherein transmitting, in the medium access control-control element message, the indication of the one or more parameters associated with the selected set of one or more parameters from the multiple sets of parameters for the configured grant transmission of the semi-persistent uplink data is based at least in part on multiplexing the medium access control-control element message with the uplink transmission.

11. The method of claim 2, wherein transmitting the indication comprises:
transmitting, in a radio resource control message, the indication of the one or more parameters associated with the selected set of one or more parameters for the configured grant transmission of the semi-persistent uplink data.

12. The method of claim 1, further comprising:
transmitting, to the base station, a report identifying a channel degradation level based at least in part on the channel condition; and
receiving, from the base station via a downlink channel, a message to select the set of one or more parameters from the multiple sets of parameters for the configured grant transmission of the semi-persistent uplink data based at least in part on the report, the set of one or more parameters comprising a periodicity, one or more offsets for one or more configured grants, a repetition factor value, or a number of slots allocated in a configured grant, or any combination thereof.

13. The method of claim 12, wherein the message comprises a medium access control-control element message, a radio resource control message, or a downlink control information, or a combination thereof.

14. A method for wireless communication at a user equipment (UE), comprising:
receiving a configuration comprising multiple sets of parameters for a configured grant transmission of semi-persistent uplink data;
selecting a set of one or more parameters from the multiple sets of parameters for the configured grant transmission of the semi-persistent uplink data based at least in part on a channel condition;
transmitting, to a base station, the configured grant transmission of the semi-persistent uplink data using the selected set of one or more parameters; and
receiving, from the base station via a downlink channel, a message comprising downlink parameters and uplink parameters associated with the configured grant transmission of the semi-persistent uplink data for an extended reality application, wherein selecting the set of one or more parameters for the configured grant transmission of the semi-persistent uplink data is based at least in part on the downlink parameters and the uplink parameters.

15. The method of claim 14, wherein the downlink parameters or the uplink parameters, or both, comprise a discontinuous reception cycle, a grant periodicity, a semi-persistent scheduling periodicity, a scheduling request periodicity, or a combination thereof.

16. A method for wireless communication at a base station, comprising:
transmitting, to a user equipment (UE), a configuration comprising multiple sets of parameters for a configured grant transmission of semi-persistent uplink data;
receiving the configured grant transmission of the semi-persistent uplink data from the UE, the configured grant transmission of the semi-persistent uplink data associated with a set of one or more parameters selected from the multiple sets of parameters;
receiving an indication of one or more parameters associated with the set of one or more parameters from the multiple sets of parameters for the configured grant transmission of the semi-persistent uplink data; and
wherein receiving the indication comprises:
receiving, in a medium access control-control element message, the indication of the one or more parameters associated with the set of one or more parameters from the multiple sets of parameters for the configured grant transmission of the semi-persistent uplink data.

17. The method of claim 16, wherein the indication identifies one or more parameter values of the one or more parameters associated with the set of one or more parameters for the configured grant transmission of the semi-persistent uplink data.

18. The method of claim 16, wherein the indication identifies the set of one or more parameters from the multiple sets of parameters for the configured grant transmission of the semi-persistent uplink data.

19. The method of claim 16, wherein the one or more parameters comprise a repetition factor value, a modulation and coding scheme index value, a transport block size index value, a number of layers, a number of antenna ports, a precoding matrix index value, or a combination thereof.

20. The method of claim 16, wherein receiving the indication comprises:
receiving, in a radio resource control message, the indication of the one or more parameters associated with the set of one or more parameters from the multiple sets of parameters for the configured grant transmission of.

21. The method of claim 16, further comprising:
receiving, from the UE, a report identifying a channel degradation level; and
transmitting, to the UE via a downlink channel, a message to select the set of one or more parameters for the configured grant transmission of the semi-persistent uplink data based at least in part on the report, the set of one or more parameters comprising a periodicity, one or more offsets for one or more configured grants, a repetition factor value, or a number of slots allocated in a configured grant, or any combination thereof.

22. The method of claim 21, wherein the message comprises a medium access control-control element message, a radio resource control message, or a downlink control information, or a combination thereof.

23. A method for wireless communication at a base station, comprising:
transmitting, to a user equipment (UE), a configuration comprising multiple sets of parameters for a configured grant transmission of semi-persistent uplink data;
receiving the configured grant transmission of the semi-persistent uplink data from the UE, the configured grant transmission of the semi-persistent uplink data associated with a set of one or more parameters selected from the multiple sets of parameters; and
transmitting, to the UE via a downlink channel, a message comprising downlink parameters and uplink parameters associated with the configured grant transmission of the semi-persistent uplink data for an extended reality application.

24. The method of claim 23, wherein the downlink parameters or the uplink parameters, or both, comprise a discontinuous reception cycle, a grant periodicity, a semi-persistent scheduling periodicity, a scheduling request periodicity, or a combination thereof.

* * * * *